(12) United States Patent
Abe et al.

(10) Patent No.: US 12,436,419 B2
(45) Date of Patent: Oct. 7, 2025

(54) LIQUID CRYSTAL DISPLAYS WITH OPTICAL SENSORS

(71) Applicant: Magnolia White Corporation, Tokyo (JP)

(72) Inventors: Hiroyuki Abe, Tokyo (JP); Akihiko Saitoh, Tokyo (JP); Masateru Morimoto, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/456,734

(22) Filed: Aug. 28, 2023

(65) Prior Publication Data

US 2024/0069372 A1     Feb. 29, 2024

(30) Foreign Application Priority Data

Aug. 29, 2022   (JP) ................................. 2022-135811

(51) Int. Cl.
    *G02F 1/133*        (2006.01)
    *G02F 1/1333*      (2006.01)

(52) U.S. Cl.
    CPC ...... *G02F 1/13312* (2021.01); *G02F 1/13338* (2013.01)

(58) Field of Classification Search
    CPC ............. G02F 1/13312; G02F 1/13318; G02F 1/136286; G02F 1/13338
    See application file for complete search history.

(56) References Cited

U.S. PATENT DOCUMENTS

| | | | |
|---|---|---|---|
| 2007/0195029 A1* | 8/2007 | Jeon | G09G 3/3648 345/87 |
| 2010/0134457 A1* | 6/2010 | Katoh | G06F 3/042 345/207 |
| 2020/0265207 A1* | 8/2020 | Chu | G02F 1/133514 |

\* cited by examiner

*Primary Examiner* — Jessica M Merlin
(74) *Attorney, Agent, or Firm* — Maier & Maier, PLLC

(57) ABSTRACT

According to one embodiment, a liquid crystal display device with an optical sensor includes a first substrate, a second substrate and a liquid crystal layer. The first substrate includes first to third signal lines, an optical sensor including a photoelectric conversion element, first to third power feeding lines supplying first to third voltages to operate the optical sensor, and a sensor signal line outputting the detection signal. The first to third power feeding lines are located between the first to third signal lines and the sensor signal line in a thickness direction.

6 Claims, 17 Drawing Sheets

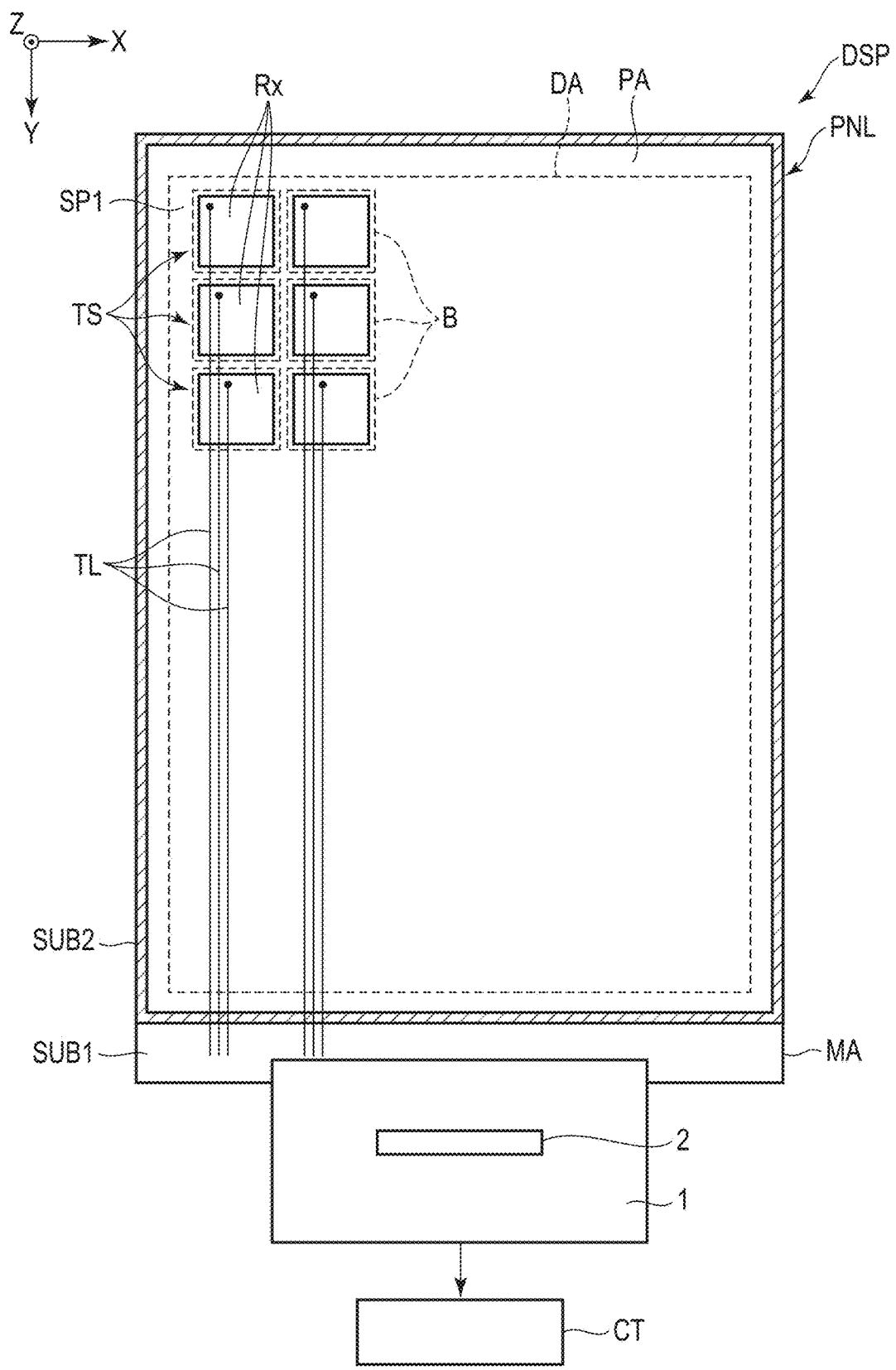
F I G. 3

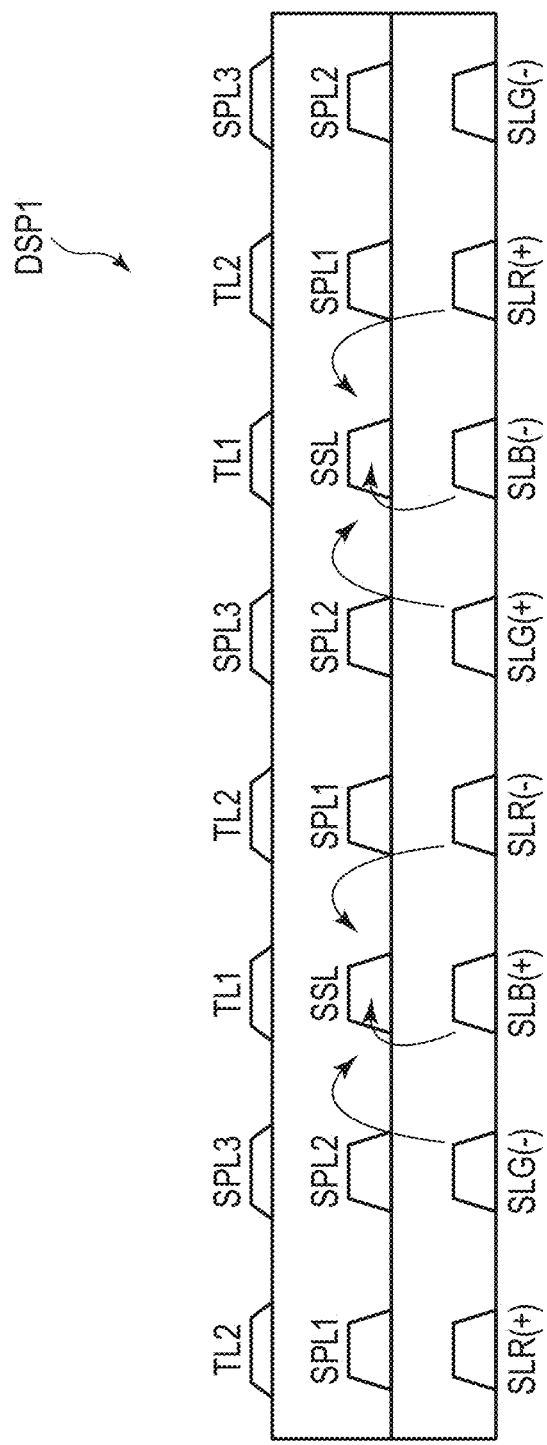
F I G. 12

LIQUID CRYSTAL DISPLAYS WITH OPTICAL SENSORS

CROSS-REFERENCE TO RELATED APPLICATIONS

This application is based upon and claims the benefit of priority from Japanese Patent Application No. 2022-135811, filed Aug. 29, 2022, the entire contents of which are incorporated herein by reference.

FIELD

Embodiments described herein relate generally to a liquid crystal display device with an optical sensor.

BACKGROUND

In recent years, liquid crystal display devices with built-in sensors that detect biometric information, such as fingerprint sensors and vein sensors, have been developed. Optical sensors using, for example, photoelectric conversion elements are used as this type of sensor. Optical sensors detect biometric information of an object by detecting light emitted from a light source such as a backlight and reflected by the object.

However, the biometric information detected in the liquid crystal display device with the optical sensor as described above may be affected by various wiring lines installed in the liquid crystal display, such as wiring lines for displaying images, as noise, and the biometric information may not be obtained with sufficient detection accuracy.

BRIEF DESCRIPTION OF THE DRAWINGS

FIG. 3 is a plan view showing a configuration example of a touch sensor mounted on the display device according to the embodiment.

FIG. 12 is a cross-sectional view showing an example of a schematic structure of a first substrate that can be applied to a display device according to a comparative example.

DETAILED DESCRIPTION

Figure 1:
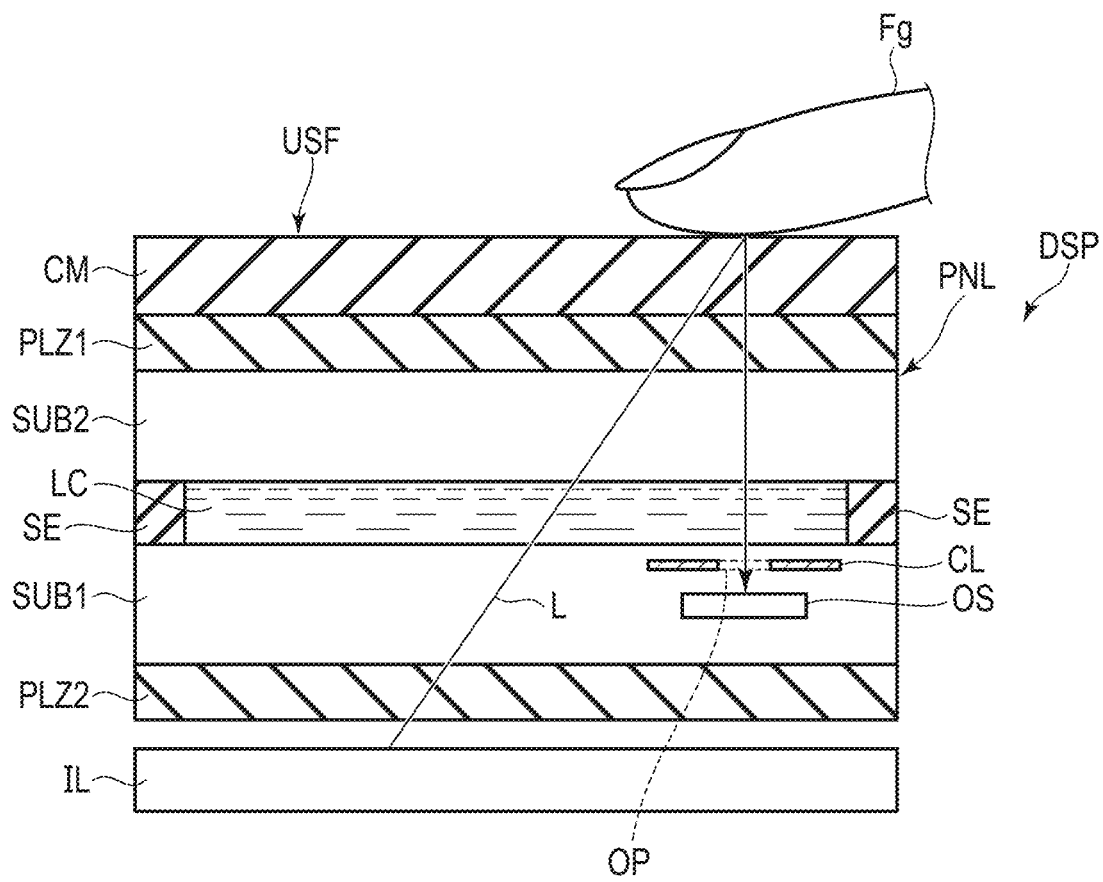
FIG. 1 schematically shows a display device according to one embodiment.

In general, according to one embodiment, a liquid crystal display device with an optical sensor comprises a first substrate, a second substrate facing the first substrate, and a liquid crystal layer located between the first substrate and the second substrate. The first substrate includes a first signal line supplying a video signal to a first sub-pixel corresponding to red, a second signal line supplying a video signal to a second sub-pixel corresponding to green, a third signal line supplying a video signal to a third sub-pixel corresponding to blue, an optical sensor comprising a photoelectric conversion element that outputs a detection signal in response to light incident from the liquid crystal layer side, a first power feeding line supplying a first voltage to operate the optical sensor, a second power feeding line supplying a second voltage to operate the optical sensor, a third power feeding line supplying a third voltage to operate the optical sensor, and a sensor signal line outputting the detection signal. The first power feeding line, the second power feeding line, and the third power feeding line are located between the first signal line, the second signal line, and the third signal line and the sensor signal line in a thickness direction.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, elements are schematically illustrated in the drawings, compared to the actual modes. However, the schematic illustration is merely an example, and adds no restrictions to the interpretation of the invention. Besides, in the specification and drawings, elements exercising the same or similar functions as those described in connection with preceding drawings are denoted by like reference numerals, and redundant detailed descriptions may be omitted.

Note that, in the drawings, an X-axis, Y-axis, and Z-axis that are orthogonal to each other are shown as necessary to facilitate understanding. A direction along the X-axis is referred to as an X-direction or first direction, a direction along the Y-axis is referred to as a Y-direction or second direction, and a direction along the Z-axis is referred to as a Z-direction, third direction, or thickness direction. A plane defined by the X and Y axes is referred to as an X-Y plane, and a plane defined by the X and Z axes is referred to as a X-Z plane. A view of observing the X-Y plane is referred to as a planar view.

FIG. 1 schematically shows a display device DSP according to one embodiment. As will be described in detail below, the display device DSP is a liquid crystal display device with an optical sensor. The display device DSP comprises a display panel PNL, a cover member CM, a first polarizing plate PLZ1, a second polarizing plate PLZ2, and an illumination device IL.

The display panel PNL is a liquid crystal display panel and is provided with a first substrate SUB1, a second substrate SUB2 facing the first substrate SUB1, a sealing material SE, and a liquid crystal layer LC. The liquid crystal layer LC is sealed between the first substrate SUB1 and the second substrate SUB2 by the sealing material SE. The display panel PNL of the present embodiment is a transmissive display panel that displays images by selectively transmitting light from a rear side of the first substrate SUB1 to an upper side of the second substrate SUB2.

The first substrate SUB1 comprises an optical sensor OS and a collimating layer CL. The optical sensor OS is located between a main surface of the first substrate SUB1 facing the second polarizing plate PLZ2 and the collimating layer CL. The collimating layer CL has an opening OP that overlaps the optical sensor OS. The collimate layer CL is formed, for example, of a metallic material and has light-shielding properties. Such a collimating layer CL may be further arranged on the second substrate SUB2 as well as on the first substrate SUB1.

The sealing material SE adheres the first substrate SUB1 and the second substrate SUB2. A predetermined cell gap is formed between the first substrate SUB1 and the second substrate SUB2 by a spacer not shown. The liquid crystal layer LC is filled within this cell gap.

The cover member CM is provided on the display panel PNL. For example, a glass substrate or a resin substrate can be used as the cover member CM. The cover member CM has an upper surface USF with which an object to be detected by the optical sensor OS contacts. Note that, in the present embodiment, it is assumed that the upper surface USF of the cover member CM is parallel to the upper surface of the optical sensor OS. In the example of FIG. 1, a finger Fg, which is an example of an object, is in contact with the upper surface USF. The first polarizing plate PLZ1 is provided between the display panel PNL and the cover member CM.

The illumination device IL is provided under the display panel PNL and irradiates light L onto the first substrate SUB1. The illumination device IL is, for example, a side-edge type backlight and is provided with a plate-shaped light guide and a plurality of light sources that emit light on the side surfaces of this light guide. The second polarizing plate PLZ2 is provided between the display panel PNL and the illumination device IL.

Of the light L, a reflected light reflected by the finger Fg is incident on the optical sensor OS through the opening OP formed in the collimating layer CL. That is, the reflected light reflected by the finger Fg passes through the cover member CM, the first polarizing plate PLZ1, the second substrate SUB2, the liquid crystal layer LC, and, further, a portion of the first substrate SUB1 that is located in an upper layer than the optical sensor OS before it is incident on the optical sensor OS.

The optical sensor OS outputs a detection signal in response to the incident light. As described below, the display panel PNL comprises a plurality of optical sensors OS, and based on the detection signals output by these optical sensors OS, it is possible to detect irregularities of the finger Fg, or fingerprint.

In order to obtain a more accurate detection signal, the optical sensor OS preferably receives incident light parallel to the normal direction of the upper surface USF. The collimating layer CL functions as a collimator to parallelize the light incident on the optical sensor OS. That is, the collimating layer CL blocks light inclined with respect to the normal direction of the upper surface USF (in other words, light inclined with respect to the normal direction of the upper surface of the optical sensor OS).

As described above, by mounting the optical sensor OS on the display device DSP, a function as a fingerprint sensor can be added to the display device DSP. The optical sensor OS can also be used to detect information related to a living body in addition to or instead of fingerprint detection. The information related to the living body is, for example, the image of blood vessels such as veins, pulse, pulse wave, etc., and is detected based on the light reflected inside the finger Fg.

Figure 2:
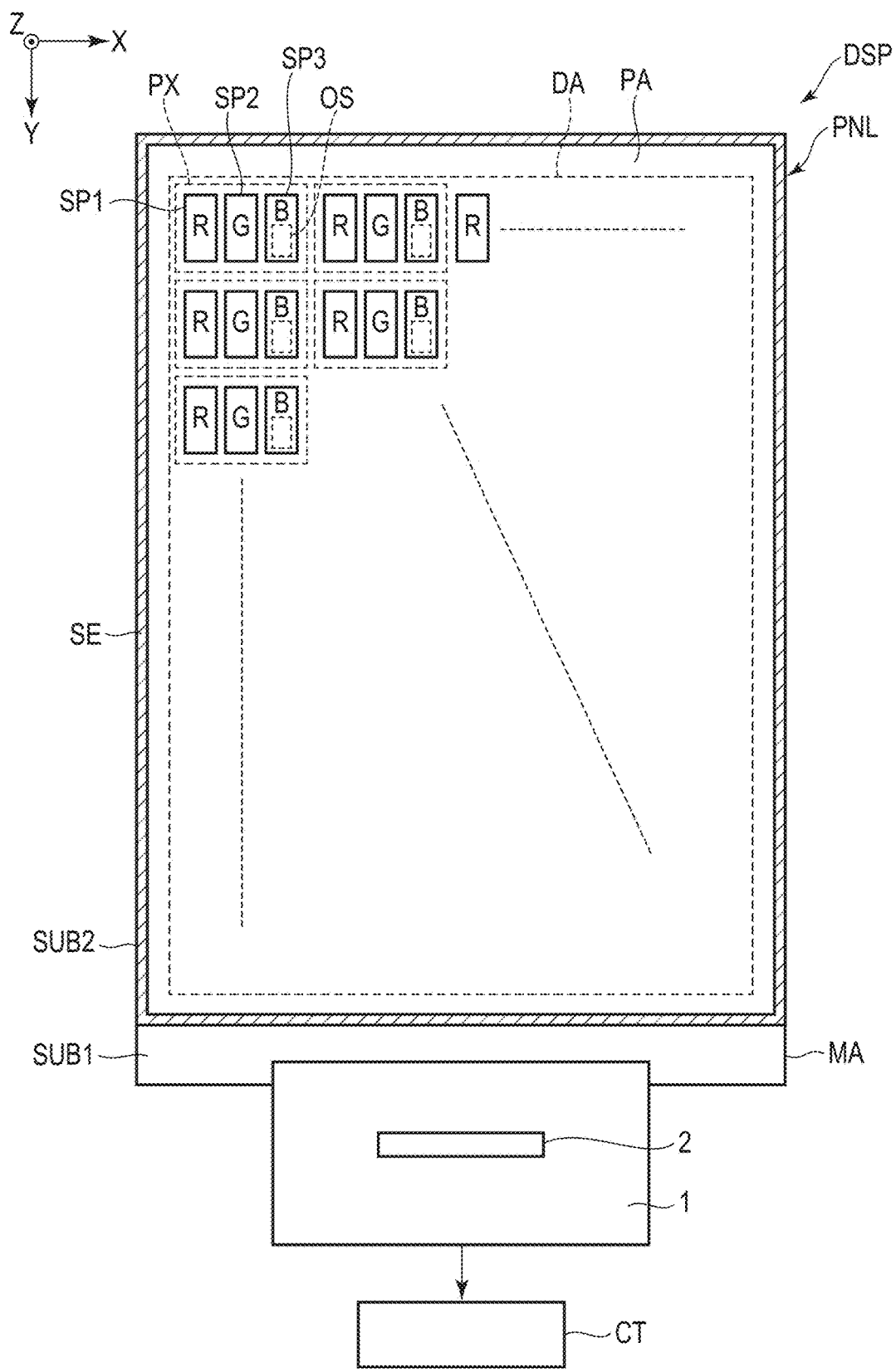
FIG. 2 is a plan view schematically showing the display device according to the embodiment.

FIG. 2 is a plan view schematically showing the display device DSP according to the present embodiment. The display device DSP comprises the display panel PNL described above and a wiring substrate 1 mounted on the display panel PNL. The display panel PNL has a display area DA for displaying images and a peripheral area PA surrounding the display area DA.

The first substrate SUB1 has a mounting area MA that does not overlap with the second substrate SUB2. The sealing material SE is located in the peripheral area PA. In FIG. 2, an area where the sealing material SE is located is indicated by a shaded line. The display area DA is located on an inner side of the sealing material SE. The display panel PNL comprises a plurality of pixels PX arranged in a matrix in the first direction X and the second direction Y in the display area DA.

The pixels PX include a sub-pixel SP1 emitting red (R) light, a sub-pixel SP2 emitting green (G) light, and a sub-pixel SP3 emitting blue (B) light. Note that the pixels PX may include sub-pixels emitting light other than red, green, and blue.

In the example of FIG. 2, one optical sensor OS is arranged for each pixel PX. More precisely, one optical sensor OS is arranged for each sub-pixel SP3 emitting blue light included in each pixel PX. In the entire display area DA, the plurality of optical sensors OS are arranged in a matrix in the first direction X and the second direction Y.

The optical sensors OS need not necessarily be arranged for all pixels PX. For example, the optical sensor OS may be arranged at a ratio of one per multiple pixels PX. The optical sensor OS may also be arranged for pixels PX in some areas of the display area DA and may not be arranged for pixels PX in other areas.

The wiring substrate 1 is, for example, a flexible circuit board and is connected to terminals provided in the mounting area MA. The wiring substrate 1 is also provided with a driver 2 that drives the display panel PNL. Note that the driver 2 may also be mounted at other locations such as the mounting area MA. For example, the driver 2 includes ICs that control a display mode for displaying images, a touch sensing mode for detecting the approach or contact of an object, and a detection operation by the optical sensor OS. These ICs may be mounted in different locations. Detection signals output by the optical sensors OS are output to a controller CT via the wiring substrate 1 and the driver 2. The controller CT executes arithmetic processing, etc., to detect fingerprints based on the detection signals from the plurality of optical sensors OS.

FIG. 3 is a plan view of showing a configuration example of a touch sensor TS. Here, a self-capacitance type touch sensor TS is described, but the touch sensor TS may be a mutual capacitance type. The touch sensor TS comprises a plurality of sensor electrodes Rx and a plurality of touch detection lines TL. The plurality of sensor electrodes Rx are located in the display area DA and arranged in a matrix in the first direction X and second direction Y. One sensor electrode Rx overlaps in planar view with the plurality of pixels PX shown in FIG. 2 and configures one sensor block B. The sensor block B is the smallest unit capable of touch sensing. A plurality of touch detection lines TL extend along the second direction Y and line up in the first direction X, respectively, in the display area DA. Each of the touch detection lines TL is arranged at a location overlapping a signal line SL, which is described below. Each of the touch detection lines TL is electrically connected to the corresponding sensor electrode Rx. Each of the touch detection lines TL is drawn out to the peripheral area PA and electrically connected to the driver 2 via the wiring substrate 1.

In the touch sensing mode, a touch drive voltage is applied to the sensor electrode Rx, and sensing is performed at the sensor electrode Rx. A sensor signal corresponding to the sensing result at the sensor electrode Rx is output to the driver 2 via the touch detection line TL. Based on the sensor signal, the driver 2 or the controller CT detects whether or not an object is approaching or contacting, and the position coordinates of the approaching or contacting object.

In the display mode, a common voltage (Vcom) is applied to the sensor electrode Rx, and the sensor electrode Rx functions as a common electrode CE described below. The common voltage is supplied, for example, via a power feeding line PL described below.

Figure 4:
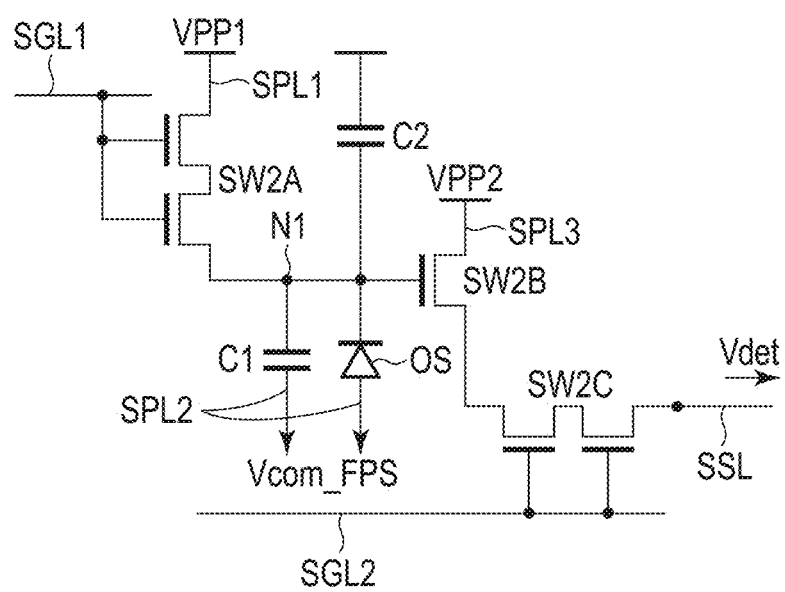
FIG. 4 is an equivalent circuit diagram showing an optical sensor and a sensor circuit connected to the optical sensor according to the embodiment.

FIG. 4 is an equivalent circuit diagram showing the optical sensor OS and a sensor circuit connected to the optical sensor OS according to the present embodiment.

As shown in FIG. 4, the sensor circuit includes a scanning line for a first sensor SGL1, a scanning line for a second sensor SGL2, a power feeding line for the first sensor SPL1, a power feeding line for the second sensor SPL2, a power feeding line for a third sensor SPL3, a sensor signal line SSL, a switching element SW2A, a switching element SW2B, a switching element SW2C, a capacitor C1, and a capacitor C2.

Note that, hereinafter, the first scanning line for the first sensor SGL1 is referred to as a first scanning line SGL1, the second scanning line for the second sensor SGL2 is referred to as a second scanning line SGL2, the power feeding line for the first sensor SPL1 is referred to as a first power feeding line SPL1, the power feeding line for the second sensor SPL2 is referred to as a second power feeding line SPL2, and the power feeding line for the third sensor SPL3 is referred to as a third power feeding line SPL3.

In FIG. 4, a case in which the switching elements SW2A, SW2B, and SW2C are each configured by an n-type thin film transistor (TFT) is shown; however, the switching elements SW2A, SW2B, and SW2C may be configured by a p-type TFT.

For the optical sensor OS, one electrode is connected to the second power feeding line SPL2, and the other electrode is connected to a node N1. The node N1 is connected to a drain electrode of the switching element SW2A and a gate electrode of the switching element SW2B. One electrode of the optical sensor OS is supplied with a second voltage Vcom_FPS through the second power feeding line SPL2. The second voltage Vcom_FPS may be referred to as a reference voltage for the sensor. In a case where light is incident on the optical sensor OS, a signal (electric charge) corresponding to the incident light intensity is output from the optical sensor OS and stored in the capacitor C1. Note that the capacitance held in the capacitor C2 is a parasitic capacitance added to the capacitance held in the capacitor C1.

For the switching element SW2A, a gate electrode is connected to the first scanning line SGL1, a source electrode is connected to the first power feeding line SPL1, and the drain electrode is connected to the node N1. When the switching element SW2A is turned on in response to a scanning signal supplied from the first scanning line SGL1, the potential of the node N1 (i.e., the potential of the other electrode of the optical sensor OS) is reset to a first potential VPP1 by a first voltage VPP1 supplied through the first power feeding line SPL1. The first voltage VPP1 may be referred to as a reset voltage. The switching element SW2A may be referred to as a reset transistor. The second voltage Vcom_FPS is lower than the first voltage VPP1, and the optical sensor OS is driven reverse biased.

For switching element SW2B, the gate electrode is connected to the node N1, a source electrode is connected to the third power feeding line SPL3 supplying a third voltage VPP2, and a drain electrode is connected to a source electrode of switching element SW2C. The gate electrode of switching element SW2B is supplied with the signal output from the optical sensor OS. The switching element SW2B outputs a voltage signal corresponding to the signal output from the optical sensor OS (voltage signal obtained by amplifying the signal output from the optical sensor OS) to the switching element SW2C. The switching element SW2B may be referred to as a source follower transistor.

For the switching element SW2C, a gate electrode is connected to the second scanning line SGL2, the source electrode is connected to the drain electrode of the switching element SW2B, and a drain electrode is connected to the sensor signal line SSL. When the switching element SW2C is turned on in response to a scanning signal supplied from the second scanning line SGL2, the voltage signal output from the switching element SW2B is output to the sensor signal line SSL as a detection signal Vdet. The switching element SW2C may be referred to as a reed transistor.

In FIG. 4, a case where the switching elements SW2A and SW2C have a double-gate structure is shown; however, the switching elements SW2A and SW2C may have a single-gate structure or a multi-gate structure.

Figure 5:
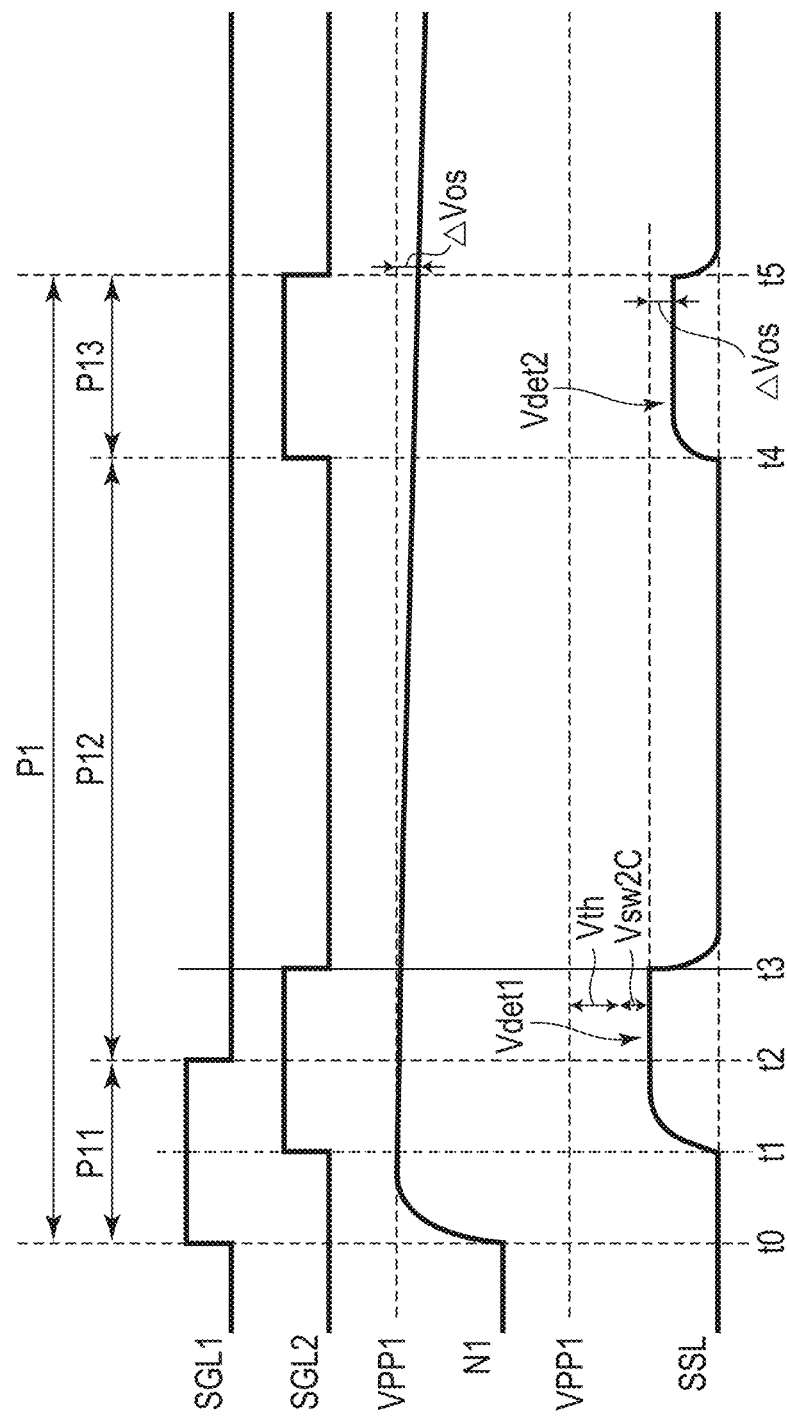
FIG. 5 illustrates an operation example of the optical sensor and the sensor circuit connected to the optical sensor according to the embodiment.

FIG. 5 illustrates an operation example of the optical sensor OS and the sensor circuit connected to the optical sensor OS according to the present embodiment. The optical sensor OS performs fingerprint imaging (detection operation) in a fingerprint imaging period P1 shown in FIG. 5. As shown in FIG. 5, the fingerprint imaging period P1 includes a reset period P11, an exposure period P12, and a read period P13. Note that, although it is not shown here, one electrode of the optical sensor OS is supplied with the second voltage Vcom_FPS over the reset period P11, the exposure period P12, and the read period P13.

The reset period P11 is a period during which the potential of the node N1 is reset. When the reset period P11 starts at time t0, and the switching element SW2A is turned on in response to the scanning signal supplied from the first scanning line SGL1, the potential of the node N1 is reset to VPP1 by the first voltage VPP1 supplied through the first power feeding line SPL1. At time t1, when the switching element SW2C is turned on in response to the scanning signal supplied from the second scanning line SGL2, a detection signal Vdet1 is output to the sensor signal line SSL. The potential of the detection signal Vdet1 becomes VPP1-Vth-Vsw2c. Note that Vth is a threshold voltage of the switching element SW2B, which is a source follower transistor, and Vsw2c is a voltage drop caused by the on-resistance of the switching element SW2C.

At time t2, when the reset period P11 ends and the exposure period P12 starts, the switching element SW2A is turned off. When the exposure period P12 starts, the potential of the node N1 gradually decreases according to the amount of light incident on the optical sensor OS (light reflected by the finger) and becomes VPP1-ΔVos. Note that ΔVos is a voltage drop generated by the light incident on the optical sensor OS. At time t3 during the exposure period P12, the switching element SW2C is turned off.

At time t4, when the exposure period P12 ends and the read period P13 starts, the switching element SW2C is turned on in response to the scanning signal supplied from the second scanning line SGL2, and a detection signal Vdet2 is output to the sensor signal line SSL. The potential of the detection signal Vdet2 becomes VPP1-Vth-Vsw2c-ΔVos. That is, the potential of the detection signal Vdet2 is lower than that of the detection signal Vdet1 described above by ΔVos. At time t5, the read period P13 ends.

The controller CT (or the driver 2) compares the potential of the detection signal Vdet1 with the potential of the detection signal Vdet2, and, based on the difference (i.e., ΔVos), light incident on the optical sensor OS can be detected. Note that, although FIG. 5 shows an operation example of one optical sensor OS and one sensor circuit, all optical sensors OS and all sensor circuits can be operated in the same manner. The controller CT (or the driver 2) can detect finger irregularities (fingerprints), blood vessel images (vein patterns), etc., by analyzing the in-plane distribution of the above-described differences obtained from all optical sensor OSs.

Figure 6:
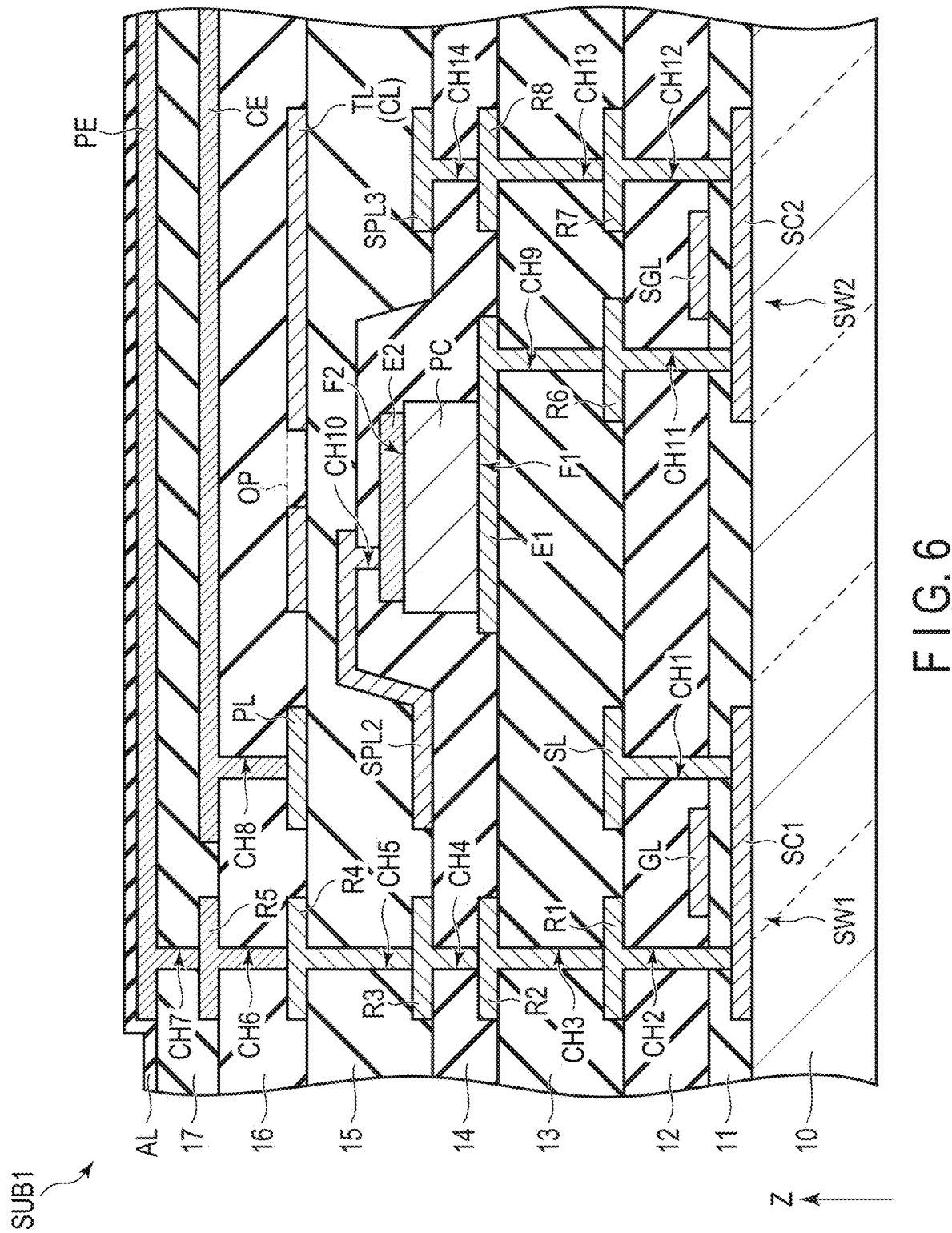
FIG. 6 is a schematic cross-sectional view showing an example of a structure that can be applied to a first substrate according to the embodiment.

FIG. 6 is a cross-sectional view showing a schematic configuration example of the first substrate SUB1. The first substrate SUB1 comprises a transparent first substrate 10, insulating layers 11, 12, 13, 14, 15, 16, and 17, and an alignment film AL.

The first substrate 10 is, for example, a glass substrate or a resin substrate. The insulating layers 11, 12, 14, and 17 are formed of inorganic materials. The insulating layers 13, 15, and 16 are formed of organic materials. The insulating layers 11, 12, 13, 14, 15, 16, and 17 and the alignment film AL are stacked in this order in the third direction Z above the first substrate 10.

The first substrate SUB1 comprises a signal line SL, a scanning line GL, a switching element SW1, a pixel electrode PE, a common electrode CE, relay electrodes R1, R2, R3, R4, and R5, and a power feeding line PL as elements related to image display. The pixel electrode PE and the switching element SW1 are provided for each of the sub-pixels SP1, SP2, and SP3. The common electrode CE is provided over a plurality of pixels PX, for example.

The switching element SW1 includes a semiconductor layer SC1. The semiconductor layer SC1 is arranged between the first base material 10 and the insulating layer 11. The scanning line GL is arranged between the insulating layers 11 and 12 and faces the semiconductor layer SC1. Note that the scanning line GL may be arranged in another layer instead of between the insulating layers 11 and 12. The signal line SL is arranged between the insulating layers 12 and 13 and is in contact with the semiconductor layer SC1 through a contact hole CH1 that penetrates the insulating layers 11 and 12.

The relay electrode R1 is arranged between the insulating layers 12 and 13, that is, on the same layer as the signal line SL, and is in contact with the semiconductor layer SC1 through a contact hole CH2 that penetrates the insulating layers 11 and 12. The relay electrode R2 is arranged between the insulating layers 13 and 14 and is in contact with the relay electrode R1 through a contact hole CH3 that penetrates the insulating layer 13. The relay electrode R3 is arranged between the insulating layers 14 and 15 and contacts the relay electrode R2 through a contact hole CH4 that penetrates the insulating layer 14. The relay electrode R4 is arranged between the insulating layers 15 and 16 and contacts the relay electrode R3 through a contact hole CH5 that penetrates the insulating layer 15. The relay electrode R5 is arranged between the insulating layers 16 and 17 and is in contact with the relay electrode R4 through a contact hole CH6 that penetrates the insulating layer 16.

The pixel electrode PE is arranged between the insulating layer 17 and the alignment film AL, and is in contact with the relay electrode R5 through a contact hole CH7 that penetrates the insulating layer 17. The power feeding line PL is arranged between the insulating layers 15 and 16, that is, on the same layer as the relay electrode R4. The common electrode CE is arranged between the insulating layers 16 and 17, that is, on the same layer as the relay electrode R5, and is in contact with the power feeding line PL through a contact hole CH8 that penetrates the insulating layer 16.

A common voltage Vcom is supplied to the power feeding line PL. The common voltage Vcom is supplied to the common electrode CE. A video signal is supplied to the signal line SL and a scanning signal is supplied to the scanning line GL. When the scanning signal is supplied to the scanning line GL, the video signal of the signal line SL is supplied to the pixel electrode PE through the semiconductor layer SC1 and the relay electrodes R1, R2, R3, R4, and R5. At this time, an electric field is generated between the pixel electrode PE and the common electrode CE due to a potential difference between the potential of the pixel electrode PE and the potential Vcom of the common electrode CE according to the video signal, and this electric field acts on the liquid crystal layer LC.

The first substrate SUB1 comprises a switching element SW2, a sensor scanning line SGL, relay electrodes R6, R7, and R8, a second power feeding line SPL2, a third power feeding line SPL3, and a touch detection line TL (collimating layer CL) as elements related to the optical sensor OS. The optical sensor OS comprises a first electrode E1 (lower electrode), a second electrode E2 (upper electrode), and a photoelectric conversion element PC.

Note that, in FIG. 6, for convenience of explanation, elements related to the multiple switching elements SW2A, SW2B, and SW2C involved in the optical sensor OS are represented as the switching element SW2. In addition, in FIG. 6, an element that functions as a gate electrode of the switching element SW2 is represented as the sensor scanning line SGL. In FIG. 6, an element that functions as a source electrode of the switching element SW2 is represented as the relay electrode R7. In FIG. 6, an element that functions as a drain electrode of the switching element SW2 is represented as the relay electrode R6. Furthermore, in FIG. 6, not all of the elements involved in the optical sensor OS, but some of them are illustrated.

The photoelectric conversion element PC has a first surface F1 facing the first substrate 10 and a second surface F2 facing the liquid crystal layer LC. The second surface F2 of the photoelectric conversion element PC corresponds to the upper surface of the optical sensor OS. The photoelectric conversion element PC is located between the insulating layers 13 and 14. The first electrode E1 is arranged between the photoelectric conversion element PC and the insulating layer 13 and is in contact with the first surface F1. The outer periphery of the first electrode E1 protrudes from the photoelectric conversion element PC and is covered by the insulating layer 14. The first electrode E1 is in contact with the relay electrode R6 through a contact hole CH9 that penetrates the insulating layer 13 below the photoelectric conversion element PC. The second electrode E2 is arranged between the photoelectric conversion element PC and the insulating layer 14 and is in contact with the second surface F2. The second electrode E2 is in contact with the second power feeding line SPL2 through a contact hole CH10 that penetrates the insulating layer 14 above the photoelectric conversion element PC.

The second power feeding line SPL2 is arranged between the insulating layers 14 and 15 and is in contact with the second electrode E2 through the contact hole CH10 penetrating the insulating layer 14. A second voltage Vcom_FPS is supplied to the second power feeding line SPL2, and the second voltage Vcom_FPS is supplied to the second electrode E2 through the second power feeding line SPL2.

The switching element SW2 includes a semiconductor layer SC2. The semiconductor layer SC2 is arranged between the first base material 10 and the insulating layer 11. The sensor scanning line SGL is arranged between the insulating layers 11 and 12 and faces the semiconductor layer SC2. Note that the sensor scanning line SGL may be arranged in another layer instead of between the insulating layers 11 and 12.

The relay electrode R6 is arranged between the insulating layers 12 and 13 and is in contact with semiconductor layer SC2 through a contact hole CH11 that penetrates the insulating layers 11 and 12. The relay electrode R7 is arranged between the insulating layers 12 and 13, that is, on the same layer as the relay electrode R6, and is in contact with semiconductor layer SC2 through a contact hole CH12 that penetrates the insulating layers 11 and 12. The relay electrode R8 is arranged between the insulating layers 13 and 14, that is, on the same layer as the first electrode E1, and is in contact with the relay electrode R7 through a contact hole CH13 that penetrates the insulating layer 13.

The third power feeding line SPL3 is arranged between the insulating layers 14 and 15, that is, on the same layer as the second power feeding line SPL2, and is in contact with the relay electrode R8 through a contact hole CH14 that penetrates the insulating layer 14. The third voltage VPP2 is supplied to the third power feeding line SPL3.

The touch detection line TL is arranged between the insulating layers 15 and 16. The opening OP is formed in the touch detection line TL, and the touch detection line TL also functions as a collimating layer CL. The opening OP is formed at a location overlapping the second surface F2 of the photoelectric conversion element PC.

The signal line SL and the relay electrodes R1, R6, and R7 are formed of the same metallic material. The first electrode E1 and the relay electrodes R2 and R8 are formed of the same metallic material. The second power feeding line SPL2, the third power feeding line SPL3, and the relay electrode R3 are formed of the same metallic material. The power feeding line PL, the touch detection line TL (collimating layer CL), and the relay electrode R4 are formed of the same metallic material. The second electrode E2, the pixel electrode PE, the common electrode CE, and the relay electrode R5 are formed of a transparent conductive material such as indium tin oxide (ITO).

The first electrode E1 formed of a metallic material also functions as a light-shielding layer, suppressing the light incident from below onto the photoelectric conversion element PC. The photoelectric conversion element PC is, for example, a photodiode, which outputs a detection signal Vdet in response to the incident light. A positive intrinsic negative (PIN) photodiode can be used as the photoelectric conversion element PC. This type of photodiode has a p-type semiconductor layer, an i-type semiconductor layer, and an n-type semiconductor layer. The p-type semiconductor layer is located on the second electrode E2 side, the n-type semiconductor layer is located on the first electrode E1 side, and the i-type semiconductor layer is located between the p-type and n-type semiconductor layers.

The p-type, i-type, and n-type semiconductor layers are formed, for example, by amorphous silicon (a-Si). Note that the materials of the semiconductor layers are not limited thereto, and amorphous silicon may be replaced by polycrystalline silicon, microcrystalline silicon, or the like, and the polycrystalline silicon may be replaced by amorphous silicon, microcrystalline silicon, or the like.

In addition, an organic photo diode (OPD) may be used instead of a PIN photodiode.

A scanning signal is supplied to the sensor scanning line SGL at the timing when detection should be performed by the sensor OS. When the scanning signal is supplied to the sensor scanning line SGL, the detection signal Vdet generated by the photoelectric conversion element PC is output to the sensor signal line SSL, which is omitted in FIG. 6. The detection signal Vdet output on the sensor signal line SSL is output to the controller CT via the driver 2, for example.

Figure 7:
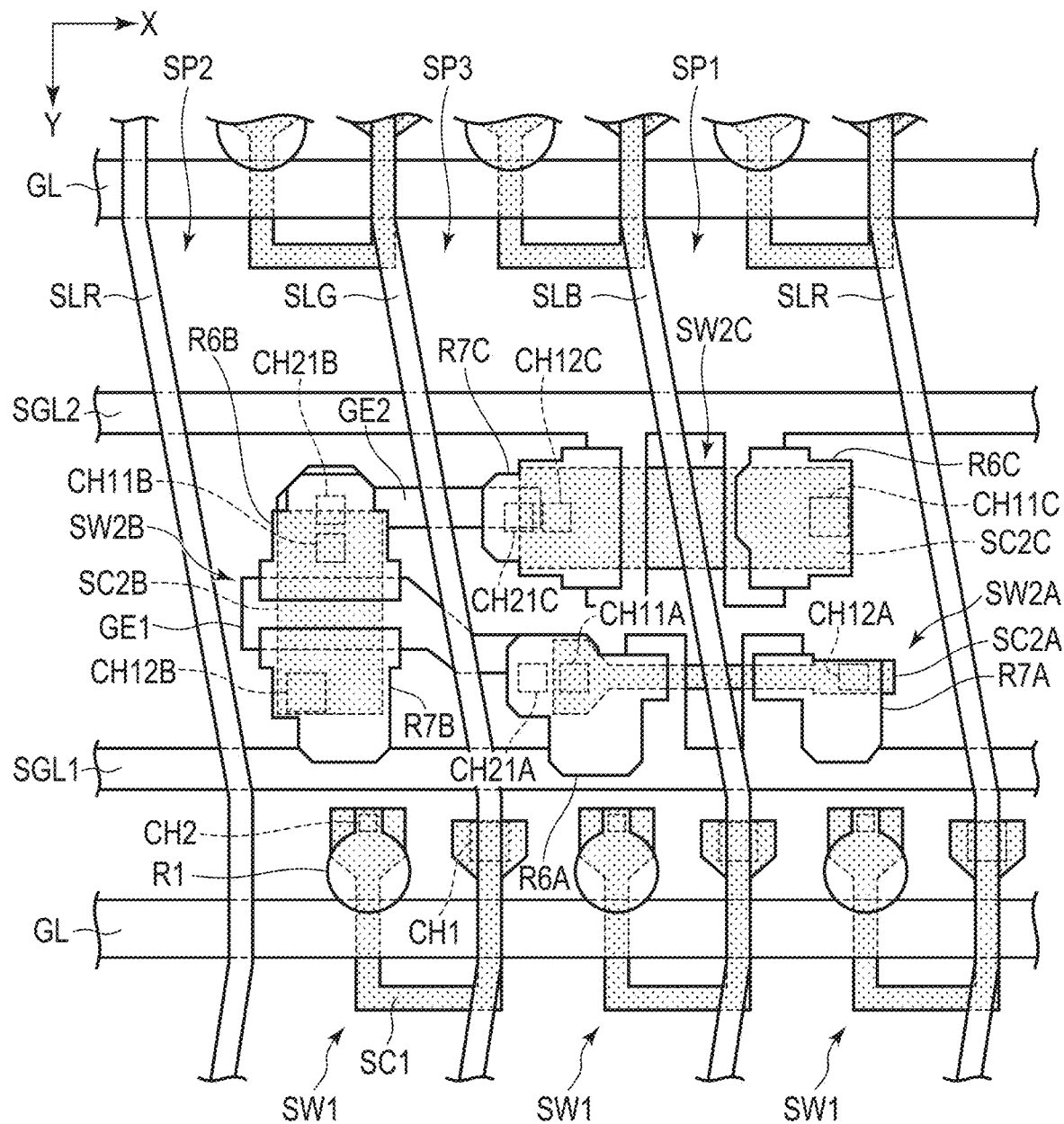
FIG. 7 is a schematic plan view showing an example of a structure that can be applied to the first substrate according to the embodiment.

FIG. 7 is a plan view schematically showing elements that can be applied to the first substrate SUB1 and that are arranged between the first substrate and the insulating layer 13 shown in FIG. 6. Note that, in FIG. 7, "A" is denoted at the end of symbols of elements related to a switching element SW2A, "B" is denoted at the end of symbols of elements related to a switching element SW2B, and "C" is denoted at the end of symbols of elements related to a switching element SW2C.

The scanning lines GL, the first scanning line SGL1, and the second scanning line SGL2 extend along the first direction X and are aligned along the second direction Y, respectively. The first scanning line SGL1 and the second scanning line SGL2 are aligned adjacent to each other in the second direction Y. The first scanning line SGL1 and the second scanning line SGL2 are arranged between two adjacent scanning lines GL.

A signal line SLR corresponding to the red sub-pixel SP1, a signal line SLG corresponding to the green sub-pixel SP2, and a signal line SLB corresponding to the blue sub-pixel SP3 extend along the second direction Y while bending, and are aligned along the first direction X.

The sub-pixels SP1, SP2, and SP3 are arranged in an area surrounded by the two scanning lines GL, which are adjacently aligned along the second direction Y, and two signal lines SL, which are adjacently aligned along the first direction X. The sub-pixels SP1, SP2, and SP3 each have an opening surrounded by the second scanning line SGL2 and the first scanning line SGL1 and the two adjacent signal lines SL.

The first scanning line SGL1 has a branch portion (convex portion) extending along the second direction Y. This branch portion serves as a gate electrode of the switching element SW2A. A semiconductor layer SC2A is arranged in an area superimposed on the gate electrode of the switching element SW2A in planar view.

The semiconductor layer SC2A is arranged across the opening of the sub-pixel SP3 and the opening of the sub-pixel SP1, and a part thereof overlaps the signal line SLB corresponding to the sub-pixel SP3. In the opening of the sub-pixel SP1, an island-shaped relay electrode R7A, which functions as a source electrode of the switching element SW2A, is arranged overlapping the semiconductor layer SC2A. The relay electrode R7A is in contact with the semiconductor layer SC2A through a contact hole CH12A. In the opening of the sub-pixel SP3, an island-shaped relay electrode R6A, which functions as the drain electrode of the switching element SW2A, is arranged overlapping the semiconductor layer SC2A. The relay electrode R6A is in contact with the semiconductor layer SC2A through a contact hole CH11A.

The relay electrode R6A is in contact with a first gate electrode GE1 that functions as the gate electrode of the switching element SW2B through a contact hole CH21A. The contact hole CH21 is a through hole penetrating the insulating layer 12 and brings an element located on the same layer as the relay electrodes R6 and R7 in contact with an element located on the same layer as the first scanning line SGL1 and the second scanning line SGL2.

The first gate electrode GE1 is arranged across the opening of the sub-pixel SP3 and the opening of the sub-pixel SP2, and a part thereof overlaps the signal line SLG corresponding to the sub-pixel SP2. In the opening of the sub-pixel SP2, a semiconductor layer SC2B is arranged in an area superimposed on the first gate electrode GE1 in planar view.

An island-shaped relay electrode R7B, which functions as a source electrode of the switching element SW2B, is arranged at a location overlapping the semiconductor layer SC2B. The relay electrode R7B is in contact with the semiconductor layer SC2B through a contact hole CH12B. An island-shaped relay electrode R6B, which functions as the drain electrode of the switching element SW2B, is arranged at a location overlapping the semiconductor layer SC2B. The relay electrode R6B is in contact with the semiconductor layer SC2B through a contact hole CH11B.

The relay electrode R6B is in contact with a second gate electrode GE2 through a contact hole CH21B. The second gate electrode GE2 is arranged across the opening of the sub-pixel SP2 and the opening of the sub-pixel SP3, and a part thereof overlaps the signal line SLG corresponding to the sub-pixel SP2. The switching element SW2B and the switching element SW2C are connected by the second gate electrode GE2.

The second scanning line SGL2 has a branch portion (convex portion) extending along the second direction Y. This branch portion serves as a gate electrode of the switching element SW2C. A semiconductor layer SC2C is arranged in an area superimposed on the gate electrode of the switching element SW2C in planar view.

The semiconductor layer SC2C is arranged across the opening of the sub-pixel SP3 and the opening of the sub-pixel SP1, and a part thereof overlaps the signal line SLB corresponding to the sub-pixel SP3. In the opening of the sub-pixel SP3, an island-shaped relay electrode R7C, which functions as the source electrode of the switching element SW2C, is arranged overlapping the semiconductor layer SC2C. The relay electrode R7C is in contact with the semiconductor layer SC2C through a contact hole CH12C.

The relay electrode R7C is also in contact with the second gate electrode GE2 through a contact hole CH21C.

In the opening of the sub-pixel SP1, an island-shaped relay electrode R6C, which functions as a drain electrode of the switching element SW2C, is arranged overlapping the semiconductor layer SC2C. The relay electrode R6C is in contact with the semiconductor layer SC2C through a contact hole CH11C.

Note that, in the opening between the first scanning line SGL1 and the scanning line GL, the switching element SW1 is arranged as an element related to image display. The semiconductor layer SC1 included in the switching element SW1 is in contact with the corresponding color signal line SL through the contact hole CH1. The semiconductor layer SC1 included in the switching element SW1 is in contact with the relay electrode R1 through the contact hole CH2.

Figure 8:
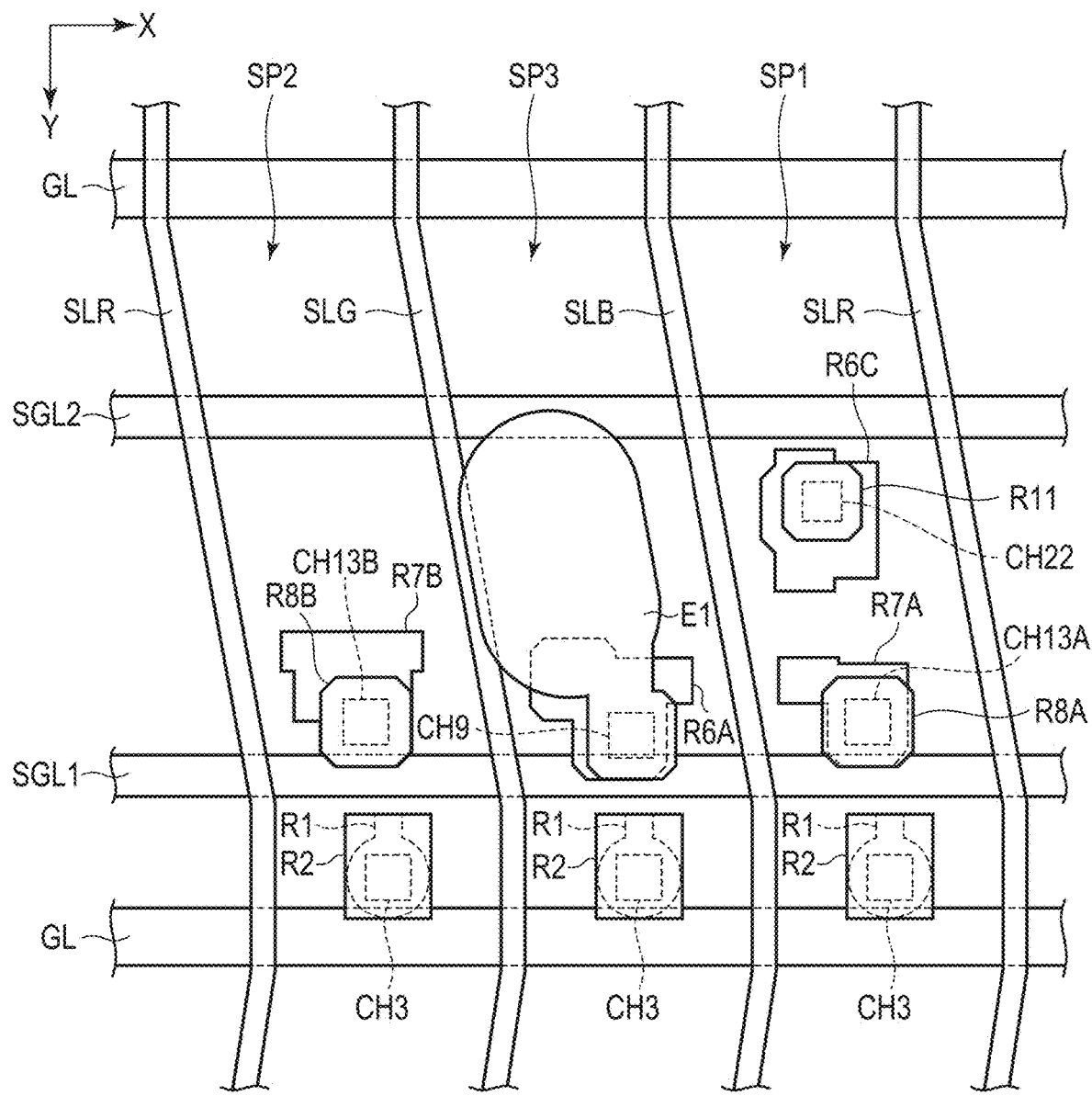
FIG. 8 is a schematic plan view showing an example of a structure that can be applied to the first substrate according to the embodiment.

FIG. 8 is a plan view schematically showing elements that can be applied to the first substrate SUB1 and that are arranged between the insulating layers 13 and 14 shown in FIG. 6. In FIG. 8, the scanning lines GL, the signal lines SL (SLR, SLG, SLB), the first scanning line SGL1 and the second scanning line SGL2 shown in FIG. 7 are also partially simplified in order to make the positional relationship easier to understand.

An island-shaped relay electrode R8A is arranged in the opening of the sub-pixel SP1. The relay electrode R8A is in contact with the relay electrode R7A on the lower layer through a contact hole CH13A.

In addition, an island-shaped relay electrode R11 is arranged in the opening of the sub-pixel SP1. The relay electrode R11 is arranged between the insulating layers 13 and 14, that is, on the same layer as the relay electrode R8 and the first electrode E1, and is in contact with the relay electrode R6C on the lower layer through a contact hole CH22. The contact hole CH22 is a through hole penetrating the insulating layer 13 and brings the relay electrode R11 in contact with the relay electrode R6C.

An island-shaped relay electrode R8B is arranged in the opening of the sub-pixel SP2. The relay electrode R8B is in contact with the relay electrode R7B on the lower layer through a contact hole CH13B.

The first electrode E1 of the optical sensor OS is arranged in the opening of the sub-pixel SP3. The first electrode E1 is in contact with the layer relay electrode R6A on the lower layer through a contact hole CH9.

Note that, in the opening between the first scanning line SGL1 and the scanning line GL, an island-shaped relay electrode R2 corresponding to each of the signal lines SLR, SLG, and SLB is arranged as an element related to image display. The relay electrode R2 is in contact with the relay electrode R1 on the lower layer through the contact hole CH3.

Figure 9:
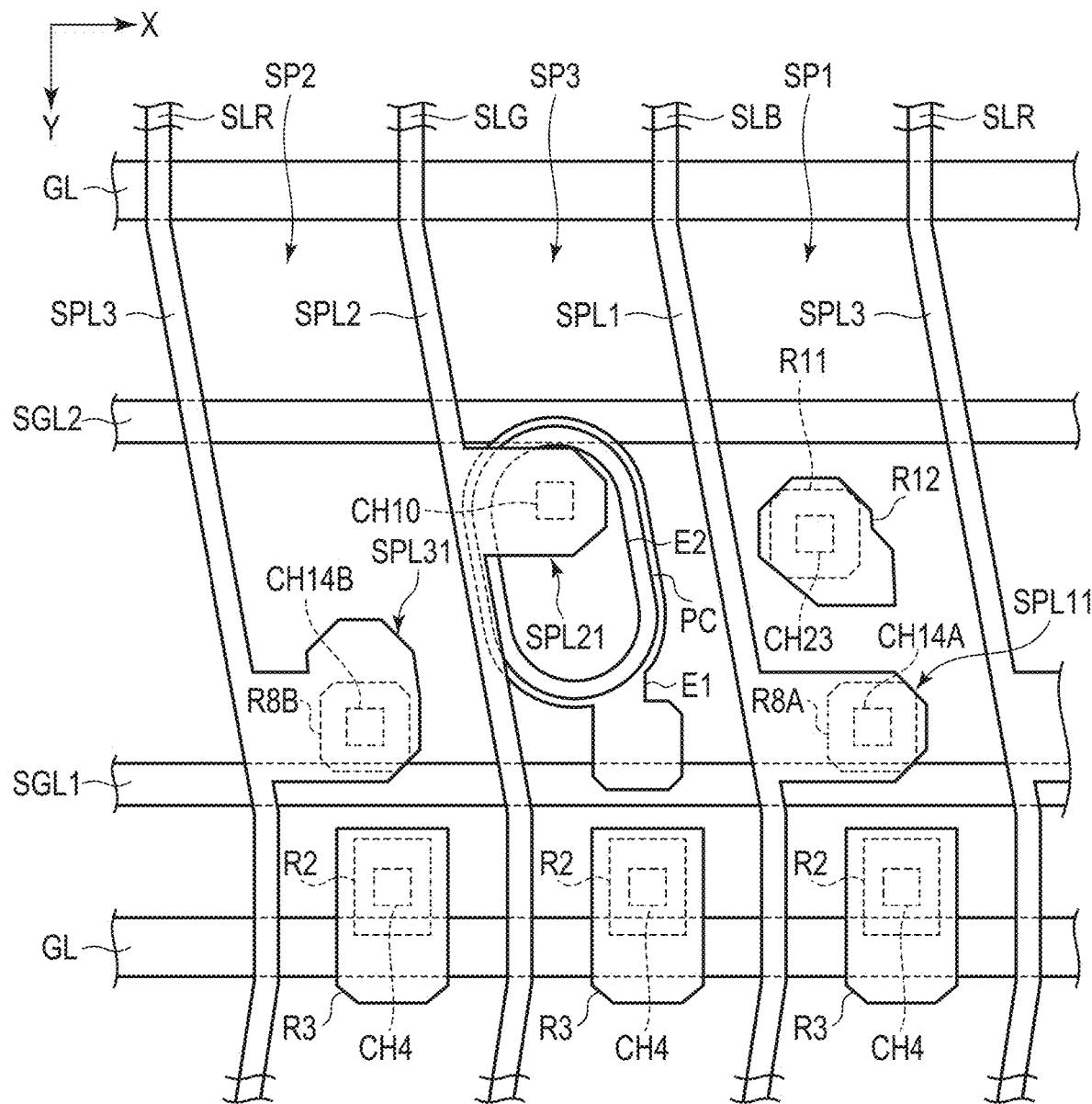
FIG. 9 is a schematic plan view showing an example of a structure that can be applied to the first substrate according to the embodiment.

FIG. 9 is a plan view schematically showing elements that can be applied to the first substrate SUB1 and that are arranged between the insulating layers 14, 15 shown in FIG. 6. In FIG. 9, the scanning lines GL, the first scanning line SGL1, and the second scanning line SGL2 shown in FIG. 7 are partially simplified in order to make the positional relationship easier to understand.

The first power feeding line SPL1, the second power feeding line SPL2, and the third power feeding line SPL3 extend along the second direction Y while bending and are aligned along the first direction X. The first power feeding line SPL1 overlaps in planar view with the signal line SLB corresponding to the blue sub-pixel SP3. The second power feeding line SPL2 overlaps in planar view with the signal line SLG corresponding to the green sub-pixel SP2. The third power feeding line SPL3 overlaps in planar view with the signal line SLR corresponding to the red sub-pixel SP1.

An island-shaped relay electrode R12 is arranged in the opening of the sub-pixel SP1. The relay electrode R12 is arranged between the insulating layers 14 and 15, that is, on the same layer as the first power feeding line SPL1, the second power feeding line SPL2, and the third power feeding line SPL3, and is in contact with the relay electrode R11 on the lower layer through a contact hole CH23. The contact hole CH23 is a through hole penetrating the insulating layer 14 and brings the relay electrode R12 in contact with the relay electrode R11.

The first power feeding line SPL1 has a branch portion (convex portion) SPL11 extending along the first direction X, and, at this branch portion SPL11, is in contact with the relay electrode R8A on the lower layer through a contact hole CH14A. As a result, the first power feeding line SPL1 and the switching element SW2A are electrically connected, and the first voltage VPP1 can be supplied to the switching element SW2A.

The photoelectric conversion element PC is arranged on the first electrode E1, which is arranged in the opening of the sub-pixel SP3. The second electrode E2 of the optical sensor OS is arranged on the photoelectric conversion element PC. The optical sensor OS has an oval shape with a major axis extending parallel to the second power feeding line SPL2 and a minor axis orthogonal to the major axis. Therefore, the photoelectric conversion element PC, the first electrode E1, and the second electrode E2 are formed in an oval shape having a major axis extending parallel to the second power feeding line SPL2 and a minor axis orthogonal to the major axis.

The second power feeding line SPL2 has a branch portion (convex portion) SPL21 extending along the first direction X, and, at this branch portion SPL21, is in contact with the second electrode E2 of the optical sensor OS through the contact hole CH10. As a result, the second power feeding line SPL2 and the optical sensor OS are electrically connected, and the second voltage Vcom_FPS can be supplied to the optical sensor OS.

The third power feeding line SPL3 has a branch portion (convex part) SPL31 extending along the first direction X, and, at this branch portion SPL31, is in contact with the relay electrode R8B on the lower layer through a contact hole CH14B. As a result, the third power feeding line SPL3 and the switching element SW2B are electrically connected, and the third voltage VPP2 can be supplied to the switching element SW2B.

Note that, in the opening between the first scanning line SGL1 and the scanning line GL, an island-shaped relay electrode R3 corresponding to each of the signal lines SLR, SLG, and SLB is arranged as an element related to image display. The relay electrode R3 is in contact with the relay electrode R2 on the lower layer through the contact hole CH4.

Figure 10:
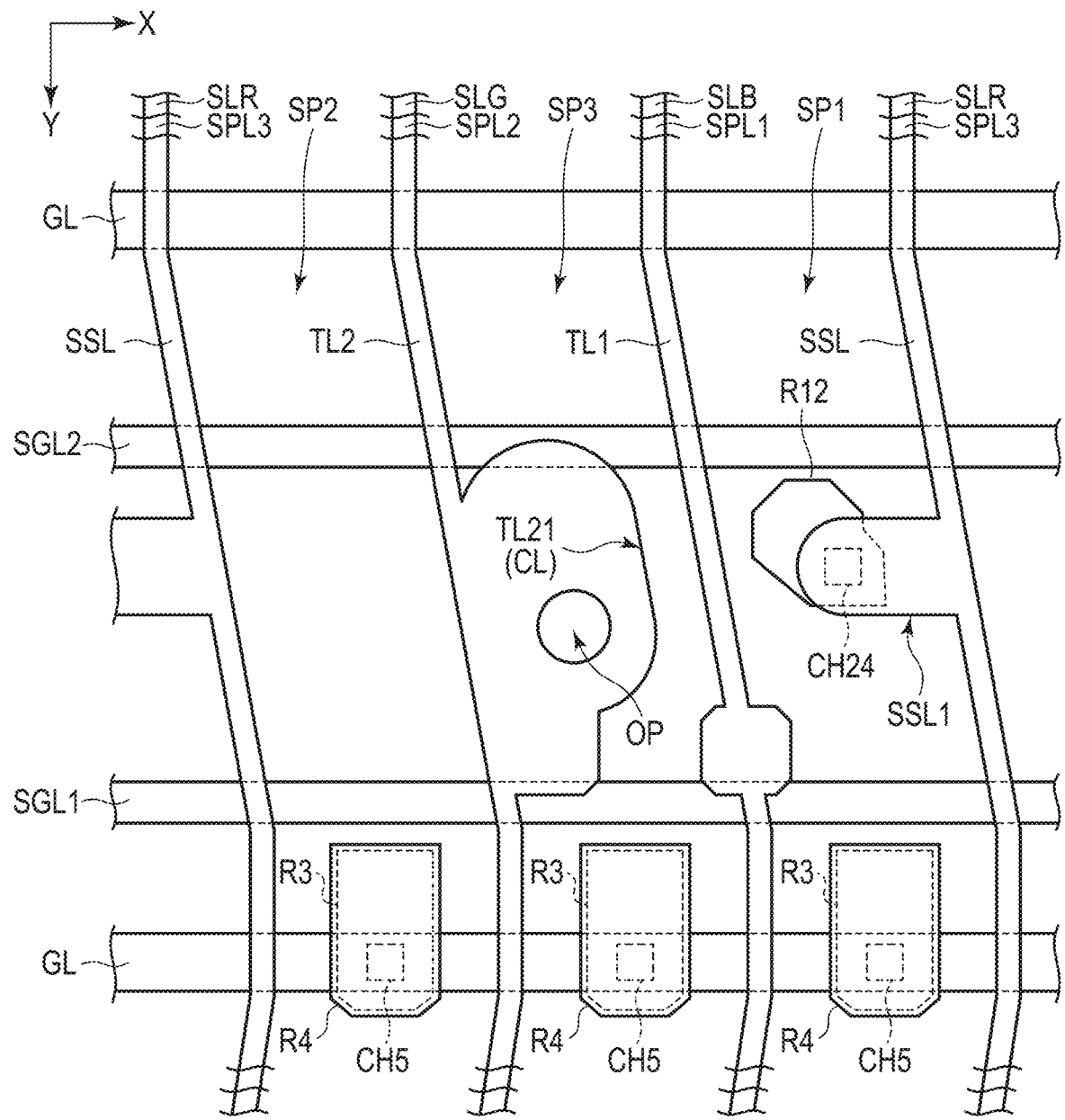
FIG. 10 is a schematic plan view showing an example of a structure that can be applied to the first substrate according to the embodiment.

FIG. 10 is a plan view schematically showing elements that can be applied to the first substrate SUB1 and that are arranged between the insulating layers 15 and 16 shown in FIG. 6. In FIG. 10, the scanning lines GL, the first scanning line SGL1, and the second scanning line SGL2 shown in FIG. 7 are partially simplified in order to make the positional relationship easier to understand.

Touch detection lines TL1 and TL2 and the sensor signal line SSL extend along the second direction Y while bending and are aligned along the first direction X. The touch detection line TL1 overlaps in planar view with the signal line SLB corresponding to the blue sub-pixel SP3 and the first power feeding line SPL1. The touch detection line TL2 overlaps in planar view with the signal line SLG corresponding to the green sub-pixel SP2 and the second power feeding line SPL2. The sensor signal line SSL overlaps in planar view with the signal line SLR corresponding to the red sub-pixel SP1 and the third power feeding line SPL3.

The touch detection lines TL1 and TL2 output sensor signals corresponding to the sensing results at the sensor electrode Rx to the driver 2.

The touch detection line TL2 has a branch portion TL21 that overlaps the outer periphery of the photoelectric conversion element PC at the opening of the sub-pixel SP3. The size of the branch portion TL21 is larger than the size of the photoelectric conversion element PC. The branch portion TL21 corresponds to the collimating layer CL, which has a circular opening OP. The collimating layer CL (branch portion TL21) transmits light from the liquid crystal layer LC side at the opening OP and blocks light from the liquid crystal layer LC side at other portions.

The sensor signal line SSL has a branch portion (convex portion) SSL1 extending along the first direction X, and, at this branch portion SSL1, is in contact with the layer relay electrode R12 on the lower layer through a contact hole CH24. The contact hole CH24 is a through hole that penetrates the insulating layer 15 and brings the sensor signal line SSL and the relay electrode R12 into contact. As a result, the sensor signal line SSL and the switching element SW2C are electrically connected, and the detection signal Vdet can be output to the sensor signal line SSL.

Note that, in the opening between the first scanning line SGL1 and the scanning line GL, an island-shaped relay electrode R4 corresponding to each of the signal lines SLR, SLG, and SLB is arranged as an element related to image display. The relay electrode R4 is in contact with the relay electrode R3 on the lower layer through the contact hole CH5.

Figure 11:
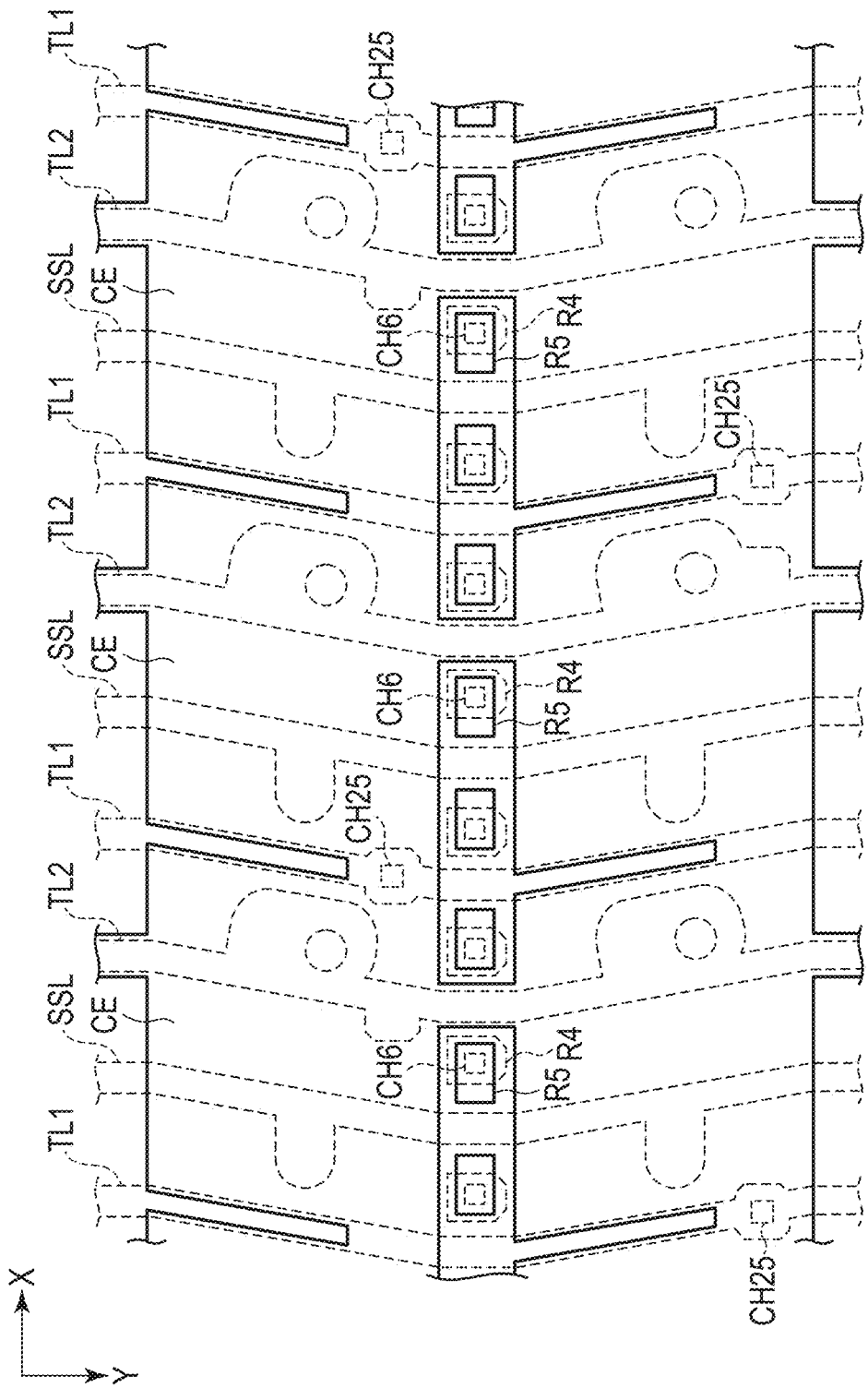
FIG. 11 is a schematic plan view showing an example of a structure that can be applied to the first substrate according to the embodiment.

FIG. 11 is a plan view schematically showing elements that can be applied to the first substrate SUB1 and that are arranged between the insulating layers 16 and 17 shown in FIG. 6.

The common electrode CE is arranged in the opening of the sub-pixels SP1, SP2, and SP3. The common electrode CE is arranged over a plurality of pixels PX. The common electrode CE is in contact with the touch detection line TL1 on the lower layer through a contact hole CH25. The contact hole CH25 is a through hole that penetrates the insulating layer 16 and brings the common electrode CE and the touch detection line TL1 into contact. The common electrode CE functions as the sensor electrode Rx in the touch sensing mode, is applied with a touch drive voltage, and outputs a sensor signal to the touch detection line TL1. Note that, although illustration is omitted in FIG. 11, the common electrode CE is also in contact with the touch detection line TL2 through a contact hole not shown. The contact hole (not shown) is arranged, for example, at a location overlapping with another pixel PX included in the same sensor block B, and at one of the locations where the common electrode CE and the touch detection line TL2 overlap.

Not that, an island-shaped relay electrode R5 corresponding to each of the signal lines SLR, SLG, and SLB is arranged as an element related to image display. The relay electrode R5 is in contact with the relay electrode R4 on the lower layer through the contact hole CH6. The relay electrode R5 is also in contact with the pixel electrode PE on the upper layer through the contact hole CH7 (see FIG. 6), which is not shown in FIG. 11. As a result, the pixel electrode PE and the switching element SW1 are electrically connected, and the video signal of the signal line SL can be supplied to the pixel electrode PE.

In the following, the effect of the display device DSP according to the present embodiment will be explained using a comparative example. Note that the comparative example is intended to illustrate some of the effects that the display device DSP according to the present embodiment can achieve, and the configuration and effects common to the present embodiment and the comparative example are not excluded from the scope of the present invention.

FIG. 12 is a cross-sectional view showing a schematic configuration example of a first substrate that can be applied to a display device DSP1 according to the comparative example. The display device DSP1 according to the comparative example differs from the display device DSP according to the present embodiment in that (1) a signal line SLR corresponding to a red sub-pixel SP1, a first power feeding line SPL1 supplying a first voltage VPP1, and a touch detection line TL2 (TL1) are arranged so that they overlap in planar view, (2) a signal line SLG corresponding to a green sub-pixel SP2, a second power feeding line SPL2 supplying a second voltage Vcom_FPS, and a third power feeding line SPL3 supplying a third voltage VPP2 are arranged so that they overlap in planar view, and (3) a signal line SLB corresponding to a blue sub-pixel SP3, a sensor signal line SSL outputting a detection signal Vdet, and a touch detection line TL1 (TL2) are arranged so that they overlap in planar view.

In such a configuration, since the sensor signal line SSL that outputs the detection signal Vdet is located directly above the signal line SLB corresponding to the blue sub-pixel SP3, the detection signal Vdet is capacitively coupled with a video signal supplied to the signal line SLB and is affected by the video signal. According to this, the effect of the video signal described above is reflected as noise in imaging data generated based on the detection signal Vdet, and, for example, may not allow fingerprints to be detected with high accuracy. For example, in a case where the display device DSP1 is driven by a column inverting drive method in which a voltage of an opposite polarity of an adjacent sub-pixel row is applied to each sub-pixel row and the polarity of the applied voltage is inverted at a predetermined cycle (for example, every frame), the imaging data generated based on the detection signal Vdet may contain a thread-like line extending along the second direction Y (more precisely, a thread-like line extending in a manner overlapping the sensor signal line SSL in planar view). Note that, here, a case is described in which the video signal supplied to the signal line SLB that overlaps the sensor signal line SSL is capacitively coupled with the detection signal Vdet and affects the imaging data generated based on the detection signal Vdet; however, since the detection signal Vdet is also capacitively coupled with the video signal supplied to the signal line SLR corresponding to the red sub-pixel SP1 or the video signal supplied to the signal line SLG corresponding to the green sub-pixel SP2 to some extent, the effect of these video signals is also reflected as noise in the imaging data generated based on the detection signal Vdet.

As described above, in the display device DSP1 according to the comparative example, since the sensor signal line SSL that outputs the detection signal Vdet is directly above the signal line SL that supplies the video signal, it may not be possible to detect fingerprints with high accuracy.

Figure 13:
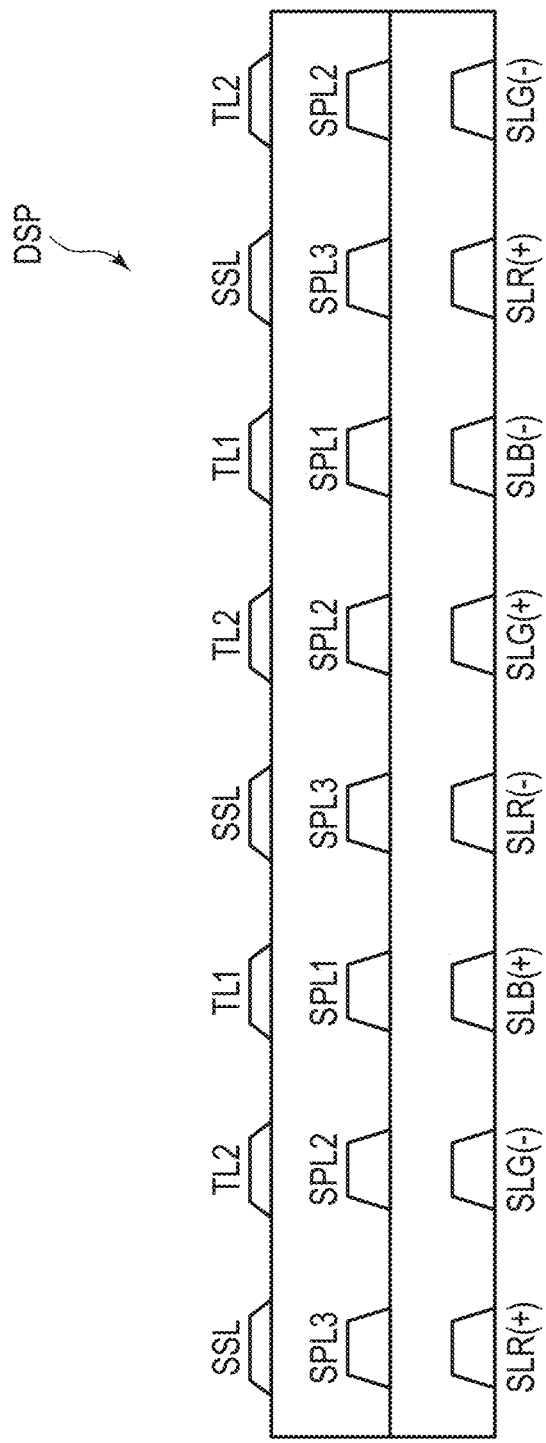
FIG. 13 is a cross-sectional view showing an example of a schematic structure of the first substrate that can be applied to the display device according to the embodiment.

In contrast, in the display device DSP of the present embodiment, as shown in FIG. 13, (1) the signal line SLR corresponding to the red sub-pixel SP1, the third power feeding line SPL3 supplying the third voltage VPP2, and the sensor signal line SSL outputting the detection signal Vdet are arranged so that they overlap in planar view, (2) the signal line SLG corresponding to the green sub-pixel SP2, the second power feeding line SPL2 supplying the second voltage Vcom_FPS, and the touch detection line TL2 are arranged so that they overlap in planar view, and (3) the signal line SLB corresponding to the blue sub-pixel SP3, the first power feeding line SPL1 supplying the first voltage VPP1, and the touch detection line TL1 are arranged so that they overlap in planar view. In other words, in the display device DSP according to the present embodiment, since the power feeding lines SPL1, SPL2, and SPL3 of fixed potentials are arranged directly above the signal line SL, it is possible to suppress the effect of the video signal on the detection signal Vdet caused by the video signal supplied to the signal line SL and the detection signal Vdet output via the sensor signal line SSL being capacitively coupled. According to this, since the noise described above will not be reflected on the imaging data generated based on the detection signal Vdet, fingerprints can be detected with high accuracy.

Figure 14:
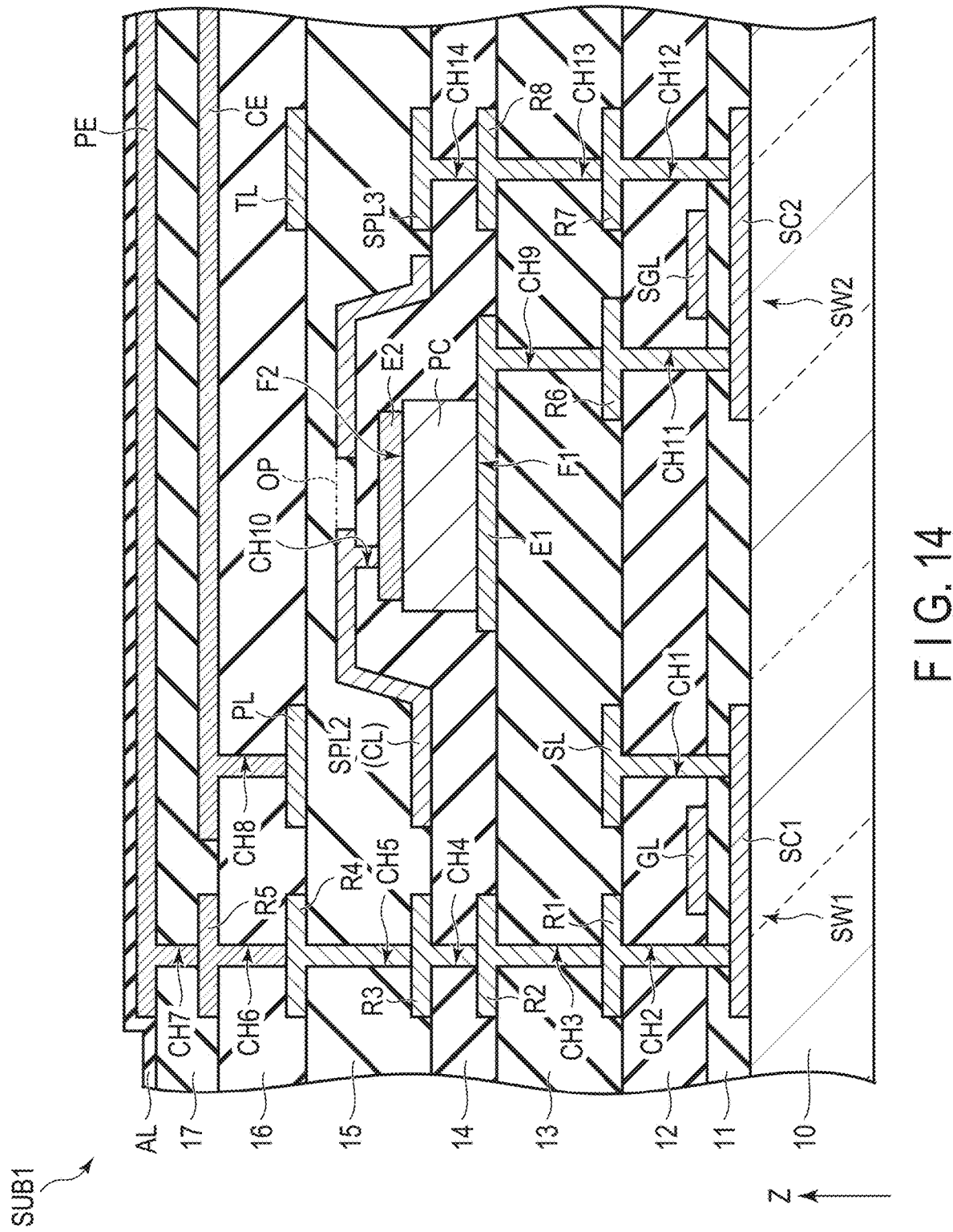
FIG. 14 is a schematic cross-sectional view showing an example of a structure that can be applied to the first substrate according to the embodiment.

Note that, in the present embodiment, as shown in the cross-sectional view in FIG. 6 and the plan view in FIG. 10, the collimating layer CL is formed and arranged between the insulating layers 15 and 16 using a part of the touch detection line TL2; however, the collimating layer CL is not limited to this configuration. The collimating layer CL may be formed and arranged between the insulating layers 14 and 15 using a part of the second power feeding line SPL2 as shown in FIG. 14. The configuration in which the collimating layer CL is formed and arranged between the insulating layers 14 and 15 using a part of the second power feeding line SPL2 is described below with reference to FIG. 15 to FIG. 17.

Figure 15:
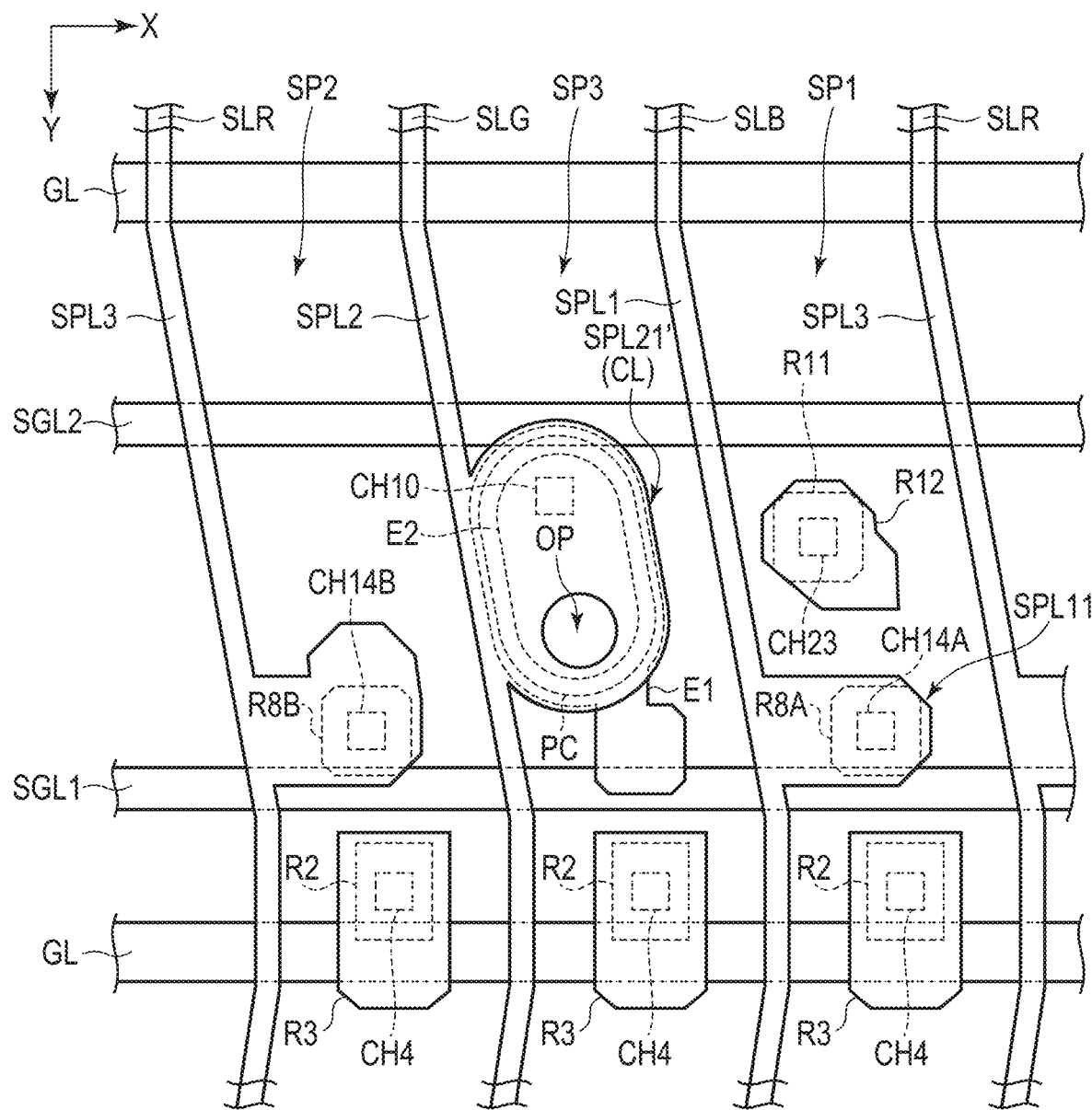
FIG. 15 is a schematic plan view showing an example of a structure that can be applied to the first substrate according to the embodiment.

FIG. 15 is a plan view schematically showing elements that can be applied to the first substrate SUB1 and arranged between the insulating layers 14 and shown in FIG. 14. In FIG. 15, in order to make the positional relationship easier to understand, the scanning lines GL, the first scanning line SGL1, and the second scanning line SGL2, which are arranged in different layers from the elements arranged between the insulating layers 14 and 15, are also partially simplified. Note that, in the following, descriptions of elements that are the same as the configuration shown in FIG. 9 will be omitted as appropriate, and only elements that are different from the configuration shown in FIG. 9 will be explained.

The photoelectric conversion element PC is arranged on the first electrode E1 arranged in the opening of the sub-pixel SP3. The second electrode E2 of the optical sensor OS is arranged on the photoelectric conversion element PC. The optical sensor OS has an oval shape with a major axis extending parallel to the second power feeding line SPL2 and a minor axis orthogonal to the major axis. The photoelectric conversion element PC, the first electrode E1, and the second electrode E2 are also formed in an oval shape.

The second power feeding line SPL2 has a branch portion SPL21' that overlaps the periphery of the photoelectric conversion element PC at the opening of the sub-pixel SP3. The size of the branch portion SPL21' is larger than the size of the photoelectric conversion element PC. This branch portion SPL21' corresponds to the collimating layer CL, which has a circular opening OP. The collimating layer CL (branch portion SPL21') transmits light from the liquid crystal layer LC side at the opening OP and blocks light from the liquid crystal layer LC side at other portions.

The second power feeding line SPL2 is in contact with the second electrode E2 of the optical sensor OS through the contact hole CH10 at the branch portion SPL21'. This electrically connects the second power feeding line SPL2 to the optical sensor OS and supplies the second voltage Vcom_FPS to the optical sensor OS.

Figure 16:
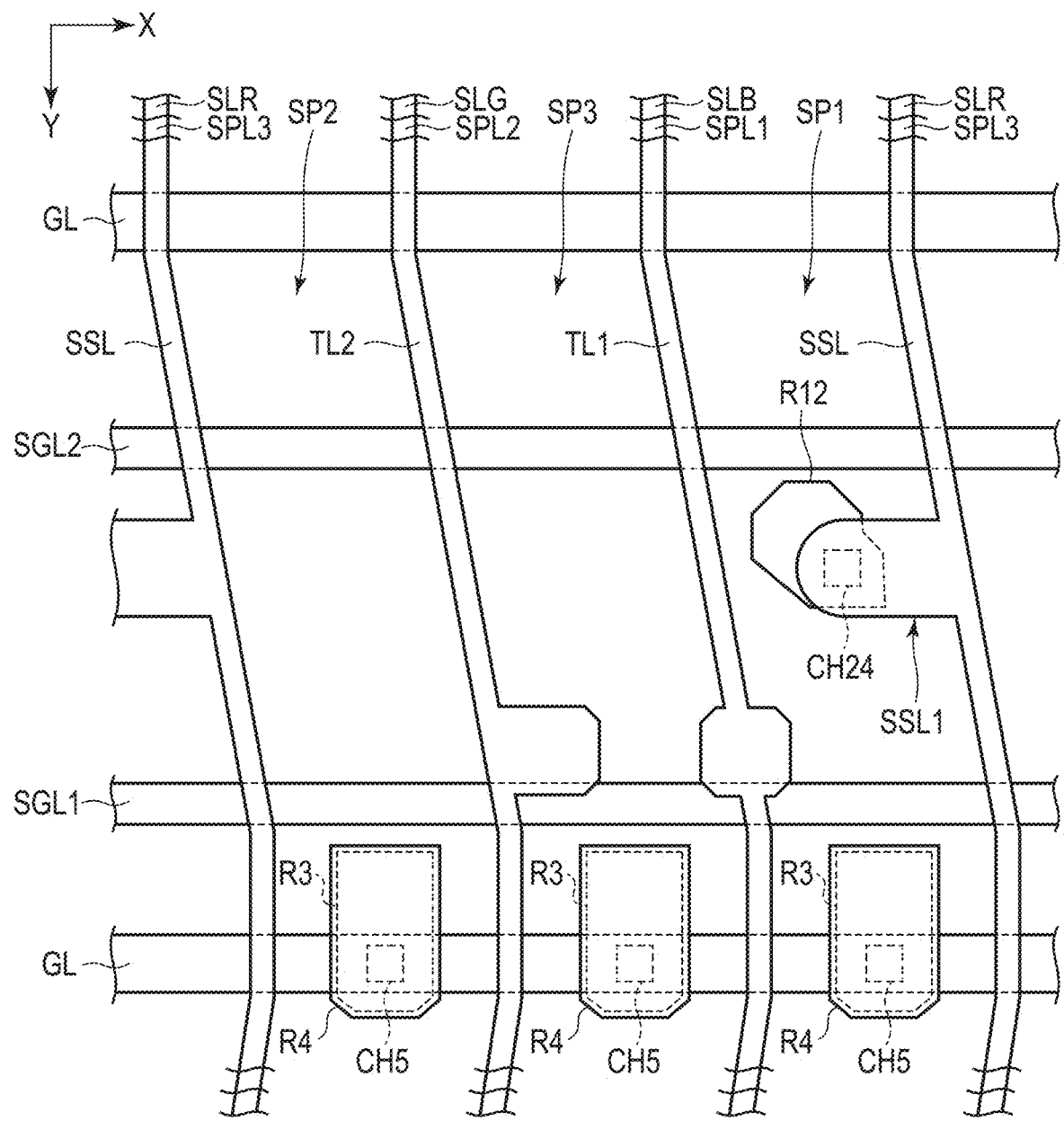
FIG. 16 is a schematic plan view showing an example of a structure that can be applied to the first substrate according to the embodiment.

FIG. 16 is a plan view schematically showing elements that can be applied to the first substrate SUB1 and that are arranged between the insulating layers 15 and 16 shown in FIG. 14. In FIG. 16, the scanning lines GL, the first scanning line SGL1, and the second scanning line SGL2 shown in FIG. 15 are partially simplified in order to make the positional relationship easier to understand. The configuration shown in FIG. 16 is similar to that shown in FIG. 10 except that the branch portion TL21 is omitted; therefore, detailed descriptions thereof are omitted here.

Figure 17:
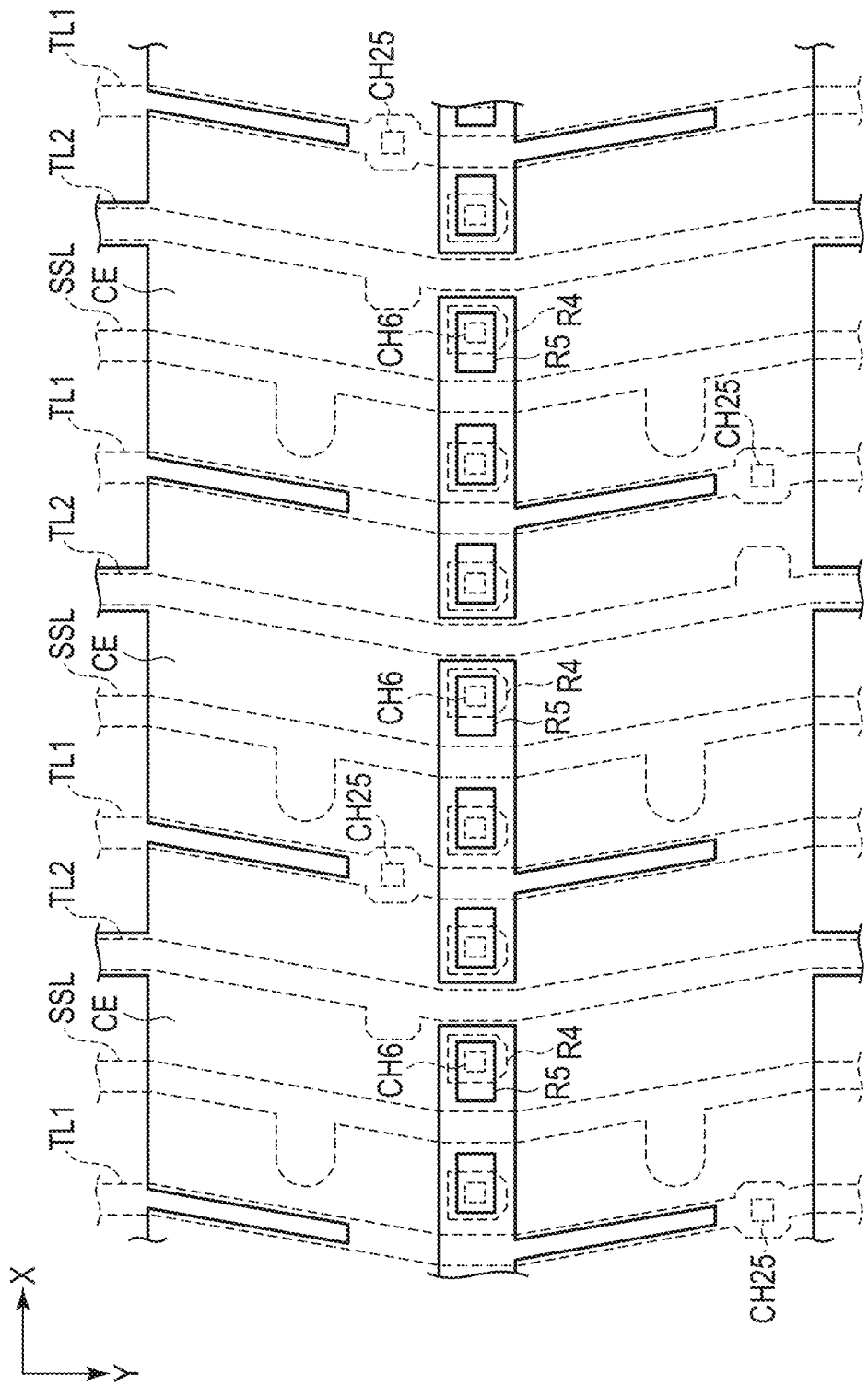
FIG. 17 is a schematic plan view showing an example of a structure that can be applied to the first substrate according to the embodiment.

FIG. 17 is a plan view schematically showing elements that can be applied to the first substrate SUB1 and that are arranged between the insulating layers 16 and 17 shown in FIG. 14. The configuration shown in FIG. 17 is also similar to that shown in FIG. 11, except that the branch portion TL21 is omitted; therefore, detailed descriptions thereof are omitted here.

As shown in FIG. 14 to FIG. 17, even in a case where the collimating layer CL is formed and arranged between the insulating layers 14 and 15 using a part of the second power feeding line SPL2, there is no change in that (1) the signal line SLR corresponding to the red sub-pixel SP1, the third power feeding line SPL3 supplying the third voltage VPP2, and the sensor signal line SSL outputting the detection signal Vdet are arranged so that they overlap in planar view, (2) the signal line SLG corresponding to the green sub-pixel SP2, the second power feeding line SPL2 supplying the second voltage Vcom_FPS, and the touch detection line TL2 are arranged so that they overlap in planar view, and (3) the signal line SLB corresponding to the blue sub-pixel SP3, the first power feeding line SPL1 supplying the first voltage VPP1, and the touch detection line TL1 are arranged so that they overlap each other in planar view. Therefore, it is possible to suppress the effect of the video signal on the detection signal Vdet caused by the video signal supplied to the signal line SL and the detection signal Vdet output via the sensor signal line SSL being capacitively coupled. In other words, fingerprints can be detected with high accuracy.

In addition, in the case of a configuration where the collimating layer CL is formed and arranged between the insulating layers 15 and 16 using a part of the touch detection line TL2, as shown in FIG. 6, since the touch detection line TL2 and the second electrode E2 are arranged facing each other, the parasitic capacitance generated between the touch detection line TL2 and the second electrode E2 may affect the sensor signal output via the touch detection line TL2, resulting in a decrease in touch detection accuracy. In contrast, in a case where the collimating layer CL is formed and arranged between the insulating layers 14 and 15 using a part of the second power feeding line SPL2, since the touch detection line TL2 does not face the second electrode E2, the above-mentioned parasitic capacitance generation can be suppressed and the above-mentioned degradation of touch detection accuracy can be suppressed.

Furthermore, in a case where the collimating layer CL is formed and arranged between the insulating layers 14 and 15 using a part of the second power feeding line SPL2, the collimating layer CL can be arranged closer to the optical sensor OS compared to the configuration where the collimating layer CL is formed and arranged between the insulating layers 15 and 16 using a part of the touch detection line TL2. Therefore, stray light, which is a part of the light irradiated from the illumination device IL, can be further suppressed from entering the optical sensor OS.

According to one embodiment described above, it is possible to provide a liquid crystal display device DSP with an optical sensor that can detect biometric information (for example, fingerprints) with high accuracy.

Note that, in the present embodiment, the display device DSP is described as a liquid crystal display device with an illumination device BL. However, the display device DSP is not limited to this and may be an organic electroluminescent display device with an organic light emitting diode (OLED) as a display element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device with an optical sensor comprising:
    a first substrate;
    a second substrate facing the first substrate; and
    a liquid crystal layer located between the first substrate and the second substrate, wherein
    the first substrate comprises:
        a first signal line that supplies a video signal to a first sub-pixel corresponding to red, a second signal line that supplies a video signal to a second sub-pixel corresponding to green, and a third signal line that supplies a video signal to a third sub-pixel corresponding to blue;
        an optical sensor comprising a photoelectric conversion element that outputs a detection signal in response to light incident from the liquid crystal layer side;
        a first power feeding line that supplies a first voltage to operate the optical sensor, a second power feeding line that supplies a second voltage to operate the optical sensor, and a third power feeding line that supplies a third voltage to operate the optical sensor; and
        a sensor signal line that outputs the detection signal,
        a sensor electrode that detects an approach or contact of an object; and
        a first detection wiring line and a second detection wiring line that are connected to the sensor electrode, wherein
    the first power feeding line is located between the third signal line and the first detection wiring line in a thickness direction of the liquid crystal display device,
    the second power feeding line is located between the second signal line and the second detection wiring line in the thickness direction,
    the third power feeding line is located between the first signal line and the sensor signal line in the thickness direction,
    the first detection wiring line and the second wiring line are arranged on the same layer as the sensor signal line,
    the second detection wiring line includes a branch portion overlapping the optical sensor in planar view, and the branch portion includes an opening that transmits light parallel to a normal direction of an upper surface of the photoelectric conversion element among light incident from the liquid crystal layer side.

2. The liquid crystal display device with the optical sensor of claim 1, wherein
the first substrate further comprises a sensor circuit connected to the optical sensor,
the optical sensor includes:
the photoelectric conversion element;
a first electrode in contact with a lower surface of the photoelectric conversion element; and
a second electrode in contact with an upper surface of the photoelectric conversion element,
the sensor circuit includes:
a first switching element for resetting a potential of the first electrode;
a second switching element for amplifying the detection signal; and
a third switching element for outputting the amplified detection signal to the sensor signal line,
the first power feeding line supplies the first voltage to the first switching element,
the second power feeding line supplies the second voltage to the second electrode, and
the third power feeding line supplies the third voltage to the second switching element.

3. The liquid crystal display device with the optical sensor of claim 2, wherein
the first signal line overlaps the third power feeding line in planar view,
the second signal line overlaps the second power feeding line in planar view, and
the third signal line overlaps the first power feeding line in planar view.

4. The liquid crystal display device with the optical sensor of claim 3, wherein
the third power feeding line overlaps the first signal line and the sensor signal line in planar view.

5. The liquid crystal display device with the optical sensor of claim 1, wherein
the second power feeding line has a branch portion overlapping the optical sensor in planar view, and
the branch portion has an opening that transmits light parallel to a normal direction of an upper surface of the photoelectric conversion element among light incident from the liquid crystal layer side.

6. The liquid crystal display device with the optical sensor of claim 1, wherein
the optical sensor is arranged in an area where the third sub-pixel is located.

* * * * *